US009983625B2

(12) United States Patent
Shim et al.

(10) Patent No.: US 9,983,625 B2
(45) Date of Patent: May 29, 2018

(54) MOBILE TERMINAL AND METHOD FOR CONTROLLING THE SAME

(71) Applicant: LG ELECTRONICS INC., Seoul (KR)

(72) Inventors: Hongjo Shim, Seoul (KR); Hyunwoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 7 days.

(21) Appl. No.: 15/075,009

(22) Filed: Mar. 18, 2016

(65) Prior Publication Data

US 2017/0083045 A1 Mar. 23, 2017

Related U.S. Application Data

(60) Provisional application No. 62/220,197, filed on Sep. 17, 2015.

(30) Foreign Application Priority Data

Nov. 4, 2015 (KR) ........................ 10-2015-0154728

(51) Int. Cl.
G09G 5/02 (2006.01)
G06F 1/16 (2006.01)
(Continued)

(52) U.S. Cl.
CPC ............. G06F 1/163 (2013.01); G04G 21/08 (2013.01); G06F 3/0488 (2013.01); G06F 3/14 (2013.01);
(Continued)

(58) Field of Classification Search
CPC . G06F 1/163; G06F 3/14; G06F 3/041; G06F 3/0414; G06F 3/04817;
(Continued)

(56) References Cited

U.S. PATENT DOCUMENTS 4,254,333 A 3/1981 Bergstrom
2010/0296369 A1 11/2010 Tortora
(Continued)

FOREIGN PATENT DOCUMENTS

DE 4041144 4/1992
WO 8403186 8/1984

OTHER PUBLICATIONS

European Patent Office Application Serial No. 16161185.0, Search Report dated Feb. 8, 2017, 8 pages.

Primary Examiner — Xilin Guo
(74) Attorney, Agent, or Firm — Lee, Hong, Degerman, Kang & Waimey

(57) ABSTRACT

A watch-type mobile terminal includes: a terminal body; a sensor unit disposed on one surface of the terminal body, configured to determine whether the watch-type mobile terminal has been worn or not, and including a light emitting portion for emitting light of a first intensity at first time intervals, and a light receiving portion for sensing reflected light; and a controller configured to control the light emitting portion to emit light of a second intensity at second time intervals between the first time intervals, wherein the controller calculates a pressure value applied to the terminal body based on an optical amount of light incident onto the light receiving portion, and generates a specific control command based on the pressure value.

20 Claims, 27 Drawing Sheets

(51) Int. Cl.
*G06F 3/14* (2006.01)
*G09G 3/20* (2006.01)
*H04N 5/232* (2006.01)
*H04N 5/225* (2006.01)
*G04G 21/08* (2010.01)
*G06F 3/0488* (2013.01)

(52) U.S. Cl.
CPC ......... *G09G 3/2003* (2013.01); *H04N 5/2256* (2013.01); *H04N 5/232* (2013.01); *G06F 2203/04105* (2013.01)

(58) Field of Classification Search
CPC ........ G06F 3/0421; G06F 1/16; G06F 3/0481; G06F 2203/04105; G06F 2203/04103; G06F 3/0416; G06F 3/0488; G09G 3/2003; G09G 3/20; H04N 5/232; H04N 5/2256; H04N 5/225; G04G 21/08; A63B 2071/0663; A61B 2562/0247; A61B 5/024; A61B 5/02427; A61B 5/02438
See application file for complete search history.

(56) References Cited

U.S. PATENT DOCUMENTS

| | | | |
|---|---|---|---|
| 2015/0371028 A1* | 12/2015 | Patel | G06F 21/44 |
| | | | 726/16 |
| 2016/0287107 A1* | 10/2016 | Szabados | A61B 5/7214 |
| 2017/0032168 A1* | 2/2017 | Kim | H04L 63/0861 |
| 2017/0075415 A1* | 3/2017 | Kim | G06F 3/011 |

* cited by examiner

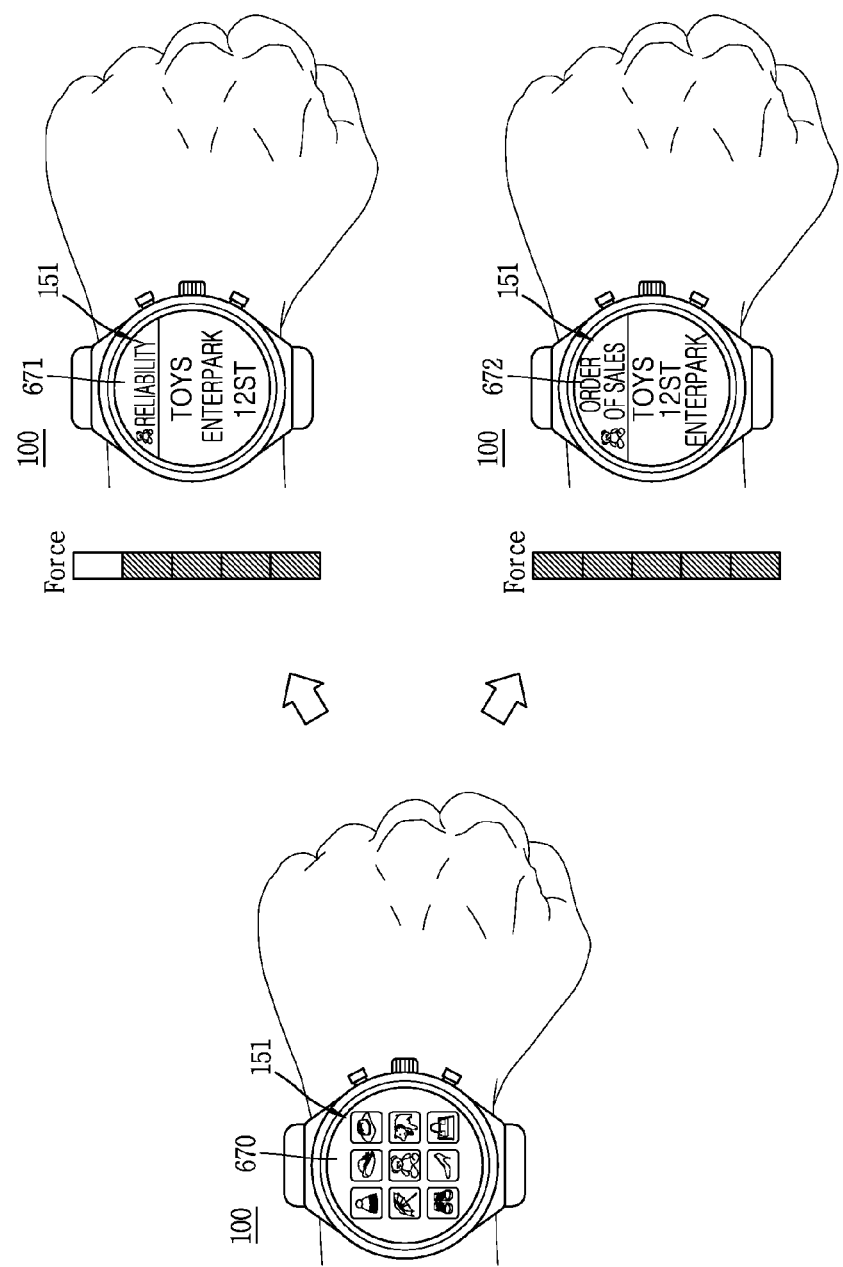

FIG. 10B
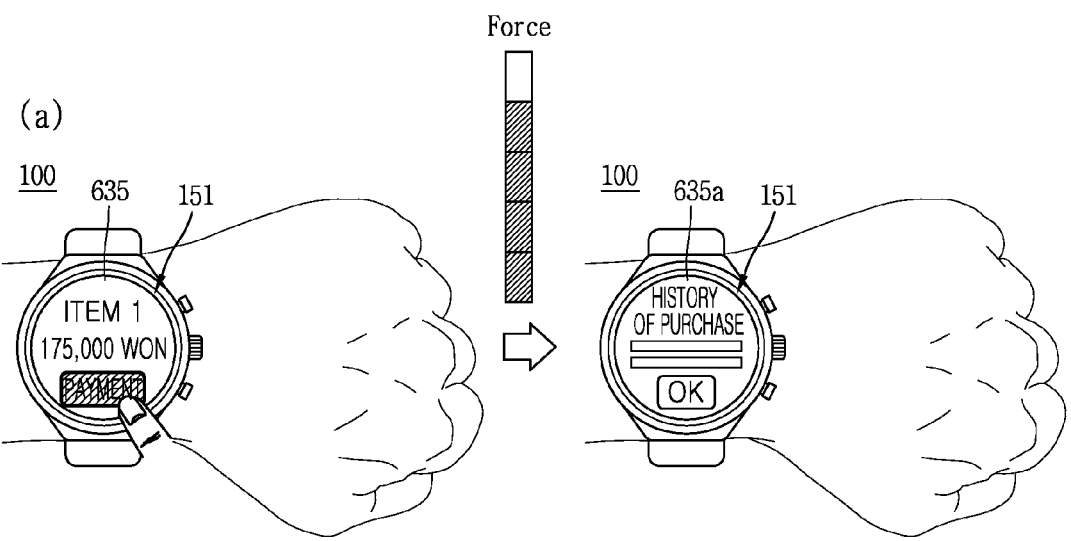
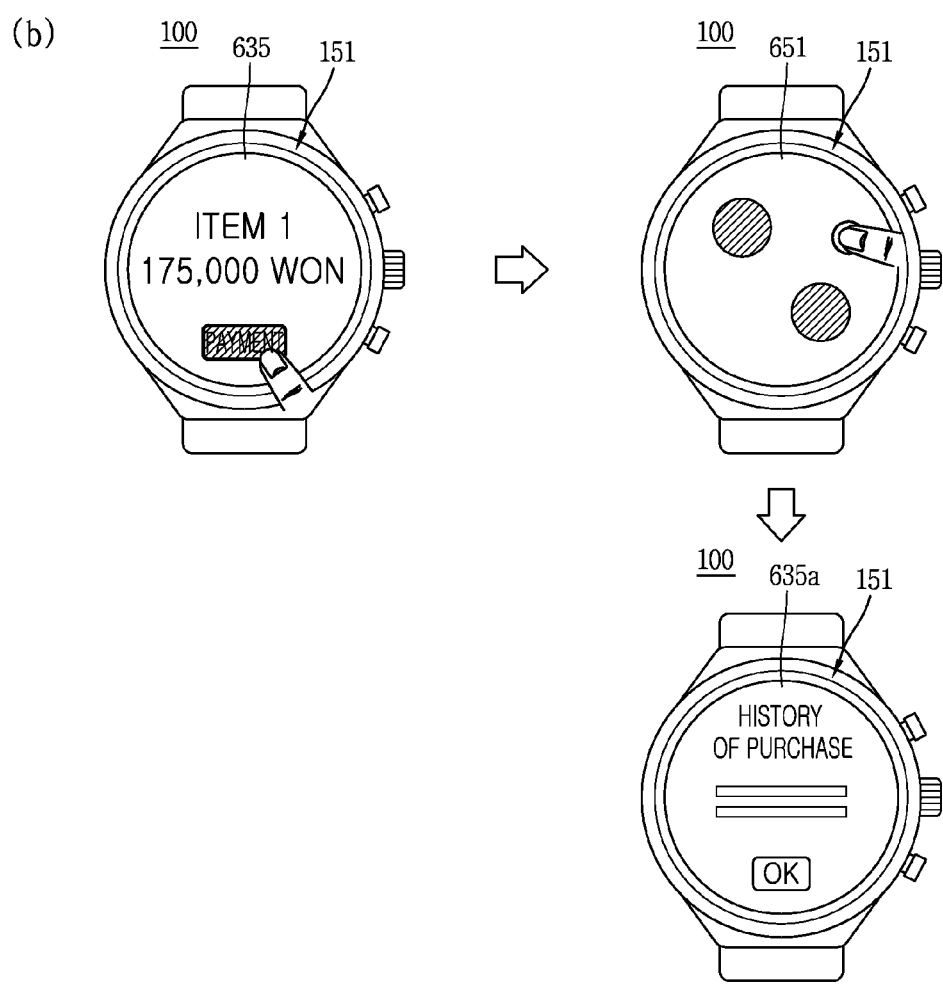

FIG. 11
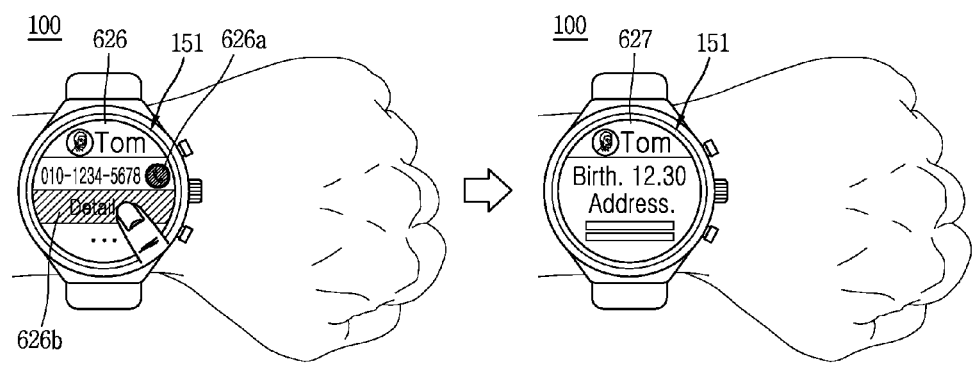
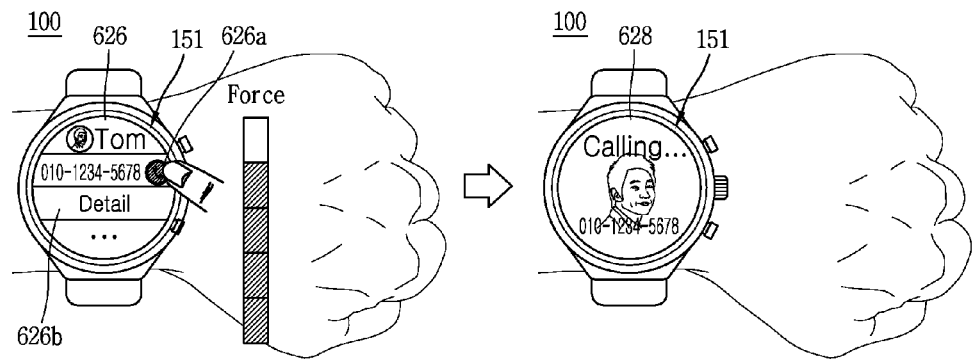

MOBILE TERMINAL AND METHOD FOR CONTROLLING THE SAME

CROSS-REFERENCE TO RELATED APPLICATION

Pursuant to 35 U.S.C. § 119(e), this application claims the benefit of U.S. Provisional Application No. 62/220,197, filed on Sep. 17, 2015, and pursuant to 35 U.S.C. § 119(a), this application also claims the benefit of earlier filing date and right of priority to Korean Application No. 10-2015-0154728, filed on Nov. 4, 2015, the contents of which are all hereby incorporated by reference herein in their entirety.

BACKGROUND OF THE INVENTION

1. Field of the Invention

The present invention relates to a mobile terminal, and more particularly, to a watch-type mobile terminal capable of being controlled based on a sensed pressure.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Various attempts have been made to implement complicated functions in such a multimedia device by means of hardware or software.

As the mobile terminal becomes multifunctional, various methods for controlling the mobile terminal are being researched. However, it is difficult to control various functions of a watch-type mobile terminal having a narrow display region on which a user's touch input is received.

Further, in case of mounting an additional sensor for setting various control commands, the thickness and the weight of the mobile terminal are increased.

SUMMARY OF THE INVENTION

Therefore, an aspect of the detailed description is to provide a mobile terminal capable of being controlled based on a pressure applied to control various functions more conveniently.

To achieve these and other advantages and in accordance with the purpose of this specification, as embodied and broadly described herein, there is provided a watch-type mobile terminal, including: a terminal body; a sensor unit disposed on one surface of the terminal body, configured to determine whether the watch-type mobile terminal has been worn or not, and including a light emitting portion for emitting light of a first intensity at first time intervals, and a light receiving portion for sensing reflected light; and a controller configured to control the light emitting portion to emit light of a second intensity at second time intervals between the first time intervals, wherein the controller calculates a pressure value applied to the terminal body based on an optical amount of light incident onto the light receiving portion, and generates a specific control command based on the pressure value.

In an embodiment of the present invention, the controller may control the second intensity and the light of the second intensity, based on information about a user's skin color. Thus, a pressure value may be calculated more precisely according to an optical amount suitable for each user having an own skin color.

In an embodiment of the present invention, the controller may generate the control command based on an applied specific type of touch input, if it is determined that the watch-type mobile terminal has not been worn. Thus, even if the watch-type mobile terminal is in a non-worn state, a user may execute a desired function.

The present invention may have the following advantages.

Firstly, since the same sensor is used to sense whether the watch-type mobile terminal has been worn and to generate a control command based on a pressure change, an additional component for executing a different function is not required. As the watch-type mobile terminal has a minimized number of components, the thickness of the watch-type mobile terminal may be reduced.

Secondly, since an intensity and an output time of light are determined based on a user's skin color, a pressure value may be precisely measured based on an amount of received light even when a user has a different skin color.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 8A to 8D are conceptual views illustrating a method of outputting different information according to a pressure value;

FIGS. 10A to 10D are conceptual views illustrating a method of controlling a pressure touch-related function when a watch-type mobile terminal is not worn;

FIG. 11 is a conceptual view illustrating a method of controlling a mobile terminal by using a pressure touch according to another embodiment of the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

The present invention may be also be applied to stationary terminals such as digital TV, desktop computers, and a digital signage, as well as mobile terminals.

Figure 1:
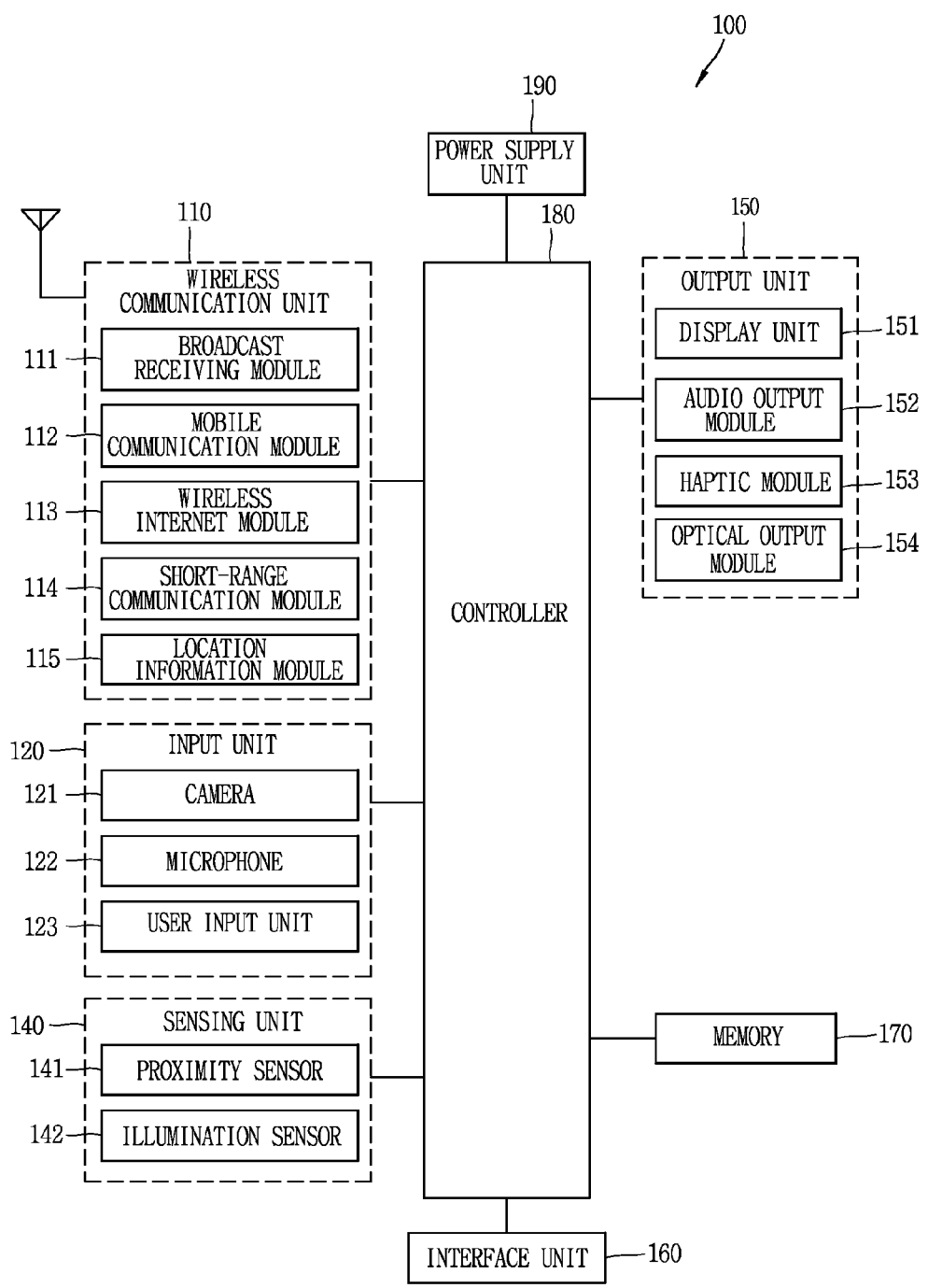
FIG. 1 is a block diagram of a watch-type mobile terminal according to the present invention.
Figure 2:
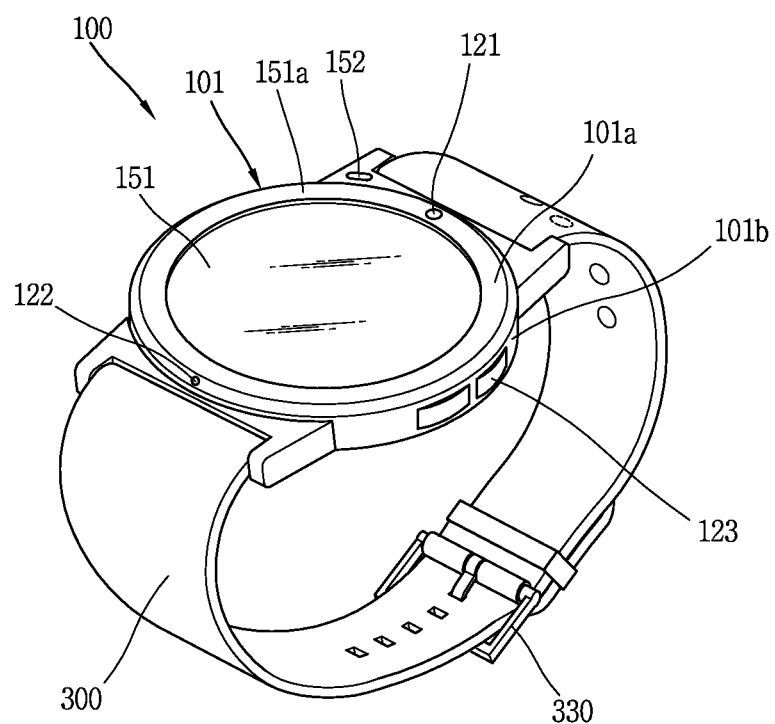
FIG. 2 is a conceptual view of a watch-type mobile terminal of the present invention, which is viewed from one direction.

FIG. 1 is an exemplary schematic view illustrating a watch-type mobile terminal according to the present invention. FIG. 2 is a conceptual view of a watch-type mobile terminal of the present invention, which is viewed from one direction.

As shown in FIG. 1, the watch-type mobile terminal 100 is shown to have components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the watch-type mobile terminal 100 and a wireless communication system, communications between the watch-type mobile terminal 100 and another mobile terminal, communications between the watch-type mobile terminal 100 and an external server. Further, the wireless communication unit 110 typically includes one or more modules which connect the watch-type mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The watch-type mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the watch-type mobile terminal 100 and a user, as well as function as the user input unit 123 which provides an input interface between the watch-type mobile terminal 100 and the user.

The interface unit 160 serves as an interface with various types of external devices that can be coupled to the watch-type mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the watch-type mobile terminal 100 may perform assorted control functions associated with a connected external device, in response to the external device being connected to the interface unit 160.

The memory 170 is typically implemented to store data to support various functions or features of the watch-type mobile terminal 100. For instance, the memory 170 may be configured to store application programs executed in the watch-type mobile terminal 100, data or instructions for operations of the watch-type mobile terminal 100, and the like. Some of these application programs may be downloaded from an external server via wireless communication. Other application programs may be installed within the watch-type mobile terminal 100 at time of manufacturing or shipping, which is typically the case for basic functions of the watch-type mobile terminal 100 (for example, receiving a call, placing a call, receiving a message, sending a message, and the like). It is common for application programs to be stored in the memory 170, installed in the watch-type mobile terminal 100, and executed by the controller 180 to perform an operation (or function) for the watch-type mobile terminal 100.

The controller 180 typically functions to control overall operation of the watch-type mobile terminal 100, in addition to the operations associated with the application programs. The controller 180 may provide or process information or functions appropriate for a user by processing signals, data, information and the like, which are input or output by the various components, or activating application programs stored in the memory 170.

As one example, the controller 180 controls some or all of the components so as to drive application programs that have been stored in the memory 170. For driving of the application programs, the controller 180 may operate at least two of the components included in the watch-type mobile terminal 100, through a combination.

The power supply unit 190 can be configured to receive external power or provide internal power in order to supply appropriate power required for operating elements and components included in the watch-type mobile terminal 100. The power supply unit 190 includes a battery, and the battery is configured to be built-in (mountable) or chargeable.

At least some of the components may operate in cooperation with one another in order to implement an operation, control or control method of the mobile terminal according to various exemplary embodiments to be described below. The operation, control or control method of the mobile terminal may be implemented on the mobile terminal by the execution of at least one application program stored in the memory 170.

Hereinafter, the aforementioned components will be explained in more detail with reference to FIG. 1, before various embodiments are explained.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the watch-type mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the watch-type mobile terminal 100 and a wireless communication system, communications between the watch-type mobile terminal 100 and another watch-type mobile terminal 100, or communications between the mobile terminal and a network where another watch-type mobile terminal 100 (or an external server) is located, via wireless area networks. One example of the wireless area networks is a wireless personal area networks.

In some embodiments, another mobile terminal (which may be configured similarly to the watch-type mobile terminal 100) may be a wearable device, for example, a smart watch, a smart glass or a head mounted display (HMD), which is able to exchange data with the mobile terminal 100 (or otherwise cooperate with the watch-type mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the watch-type mobile terminal 100. As another example, the cameras 121 may be located in a stereoscopic arrangement to acquire left and right images for implementing a stereoscopic image.

The microphone 122 is generally implemented to permit audio input to the watch-type mobile terminal 100. The audio input can be processed in various manners according to a function being executed in the watch-type mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the watch-type mobile terminal 100. The user input unit 123 may include one or more of a mechanical input element (for example, a key, a button located on a front and/or rear surface or a side surface of the watch-type mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the watch-type mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the watch-type mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the watch-type mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the watch-type mobile terminal 100. For example, the display unit 151 may display execution screen information of an application program executing at the watch-type mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the watch-type mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the watch-type mobile terminal 100.

An optical output module 154 can output a signal for indicating an event generation using light of a light source. Examples of events generated in the watch-type mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the watch-type mobile terminal 100. For example, the interface unit 160 can receive data transmitted from an external device, receive power to transfer to elements and components within the watch-type mobile terminal 100, or transmit internal data of the watch-type mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the watch-type mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the watch-type mobile terminal 100 is connected with an external cradle, the interface unit 160 can serve as a passage to allow power from the cradle to be supplied to the watch-type mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The watch-type mobile terminal 100 may also be operated in relation to a network storage device that performs the storage function of the memory 170 over a network, such as the Internet.

The controller 180 may typically control the general operations of the watch-type mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the watch-type mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

FIG. 2 is a perspective view illustrating one example of a watch-type mobile terminal 100 in accordance with another exemplary embodiment, which is viewed from one direction.

As illustrated in FIG. 2, the watch-type mobile terminal 100 includes a main body 101 with a display unit 151 and a band 300 connected to the main body 101 to be wearable on a wrist. In general, the watch-type mobile terminal 100 may be configured to include features that are the same or similar to that of the watch-type mobile terminal 100 of FIG. 1.

The main body 101 may include a case having a certain appearance. As illustrated, the case may include a first case 101a and a second case 101b cooperatively defining an inner space for accommodating various electronic components. Other configurations are possible. For instance, a single case may alternatively be implemented, with such a case being configured to define the inner space, thereby implementing a watch-type mobile terminal 100 with a uni-body.

The watch-type mobile terminal 100 can perform wireless communication, and an antenna for the wireless communication can be installed in the main body 101. The antenna may extend its function using the case. For example, a case including a conductive material may be electrically connected to the antenna to extend a ground area or a radiation area.

The display unit 151 is shown located at the front side of the main body 101 so that displayed information is viewable to a user. In some embodiments, the display unit 151 includes a touch sensor so that the display unit can function as a touch screen. As illustrated, window 151a is positioned on the first case 101a to form a front surface of the terminal body together with the first case 101a.

The illustrated embodiment includes an audio output module 152, a camera 121, a microphone 122, and a user input unit 123 positioned on the main body 101. When the display unit 151 is implemented as a touch screen, additional function keys may be minimized or eliminated. For example, when the touch screen is implemented, the user input unit 123 may be omitted.

The band 300 is commonly worn on the user's wrist and may be made of a flexible material for facilitating wearing of the device. As one example, the band 300 may be made of fur, rubber, silicon, synthetic resin, or the like. The band 300 may also be configured to be detachable from the main body 101. Accordingly, the band 300 may be replaceable with various types of bands according to a user's preference.

In one configuration, the band 300 may be used for extending the performance of the antenna. For example, the band may include therein a ground extending portion (not shown) electrically connected to the antenna to extend a ground area.

The band 300 may include fastener 330. The fastener 330 may be implemented into a buckle type, a snap-fit hook structure, a Velcro® type, or the like, and include a flexible section or material. The drawing illustrates an example that the fastener 330 is implemented using a buckle.

Figure 3:
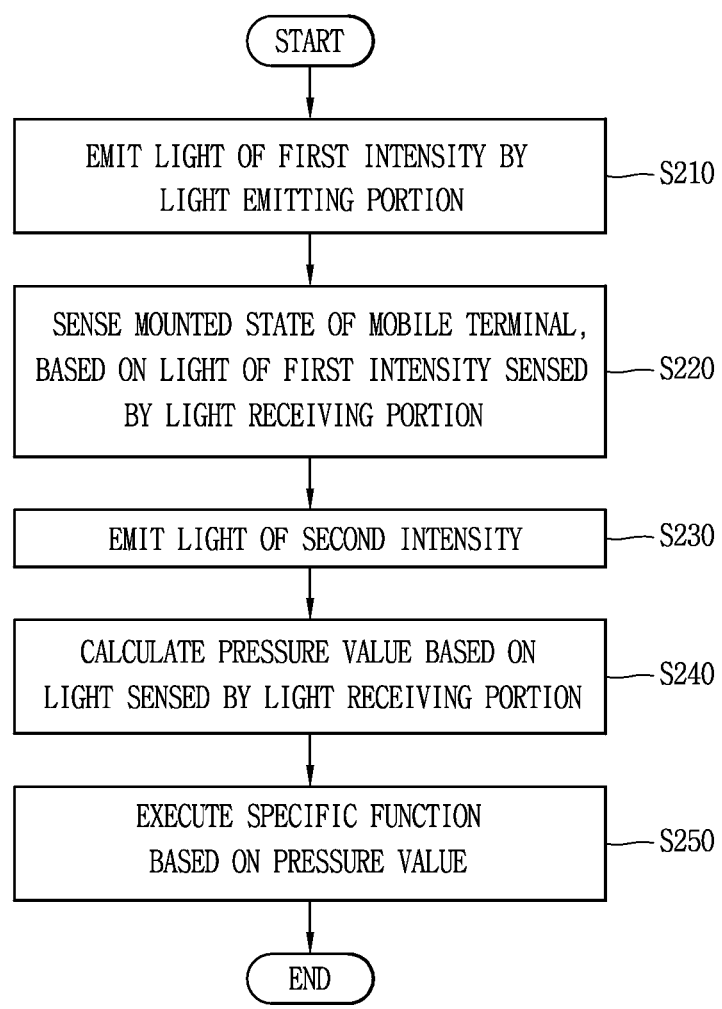
FIG. 3 is a conceptual view illustrating a control method of a watch-type mobile terminal according to an embodiment of the present invention.

FIG. 3 is a conceptual view illustrating a control method of a watch-type mobile terminal according to an embodiment of the present invention, and FIGS. 4A to 4E are conceptual views illustrating a control principle of the watch-type mobile terminal shown in FIG. 3.

Figure 4A:
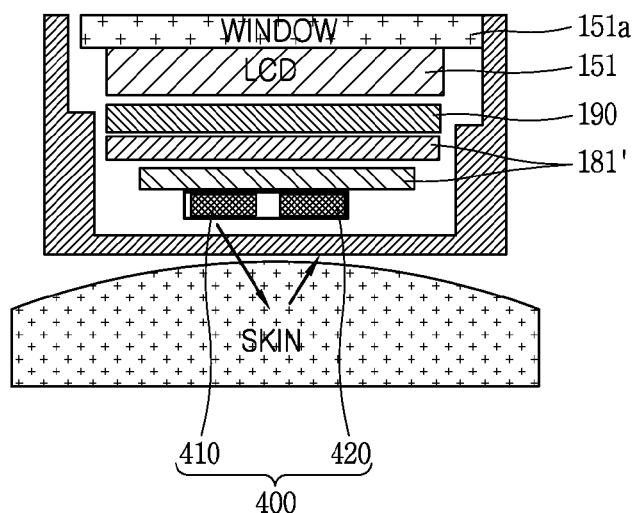
FIGS. 4A to 4E are conceptual views illustrating a control principle of the watch-type mobile terminal shown in FIG. 3.

Referring to FIG. 4A, a sensor unit 400 is disposed close to one surface of the terminal body. The display unit 151 is disposed on an opposite surface to the one surface, and the window 151a is disposed on the display unit 151 to form appearance of the mobile terminal. The display unit 151 and the sensor unit 400 are formed on different surfaces of the watch-type mobile terminal 100.

A plurality of electronic components such as the power supply unit 190 and a circuit board 181' may be mounted between the display unit 151 and the sensor unit 400. When the watch-type mobile terminal 100 is worn on a user's wrist, the window 151a is exposed to the outside and the sensor unit 400 faces the user's wrist. The sensor unit 400 may be mounted in the terminal body 101 so as to be moveable. With such a configuration, when a pressure is applied to the display unit 151, the sensor unit 400 or the terminal body 101 may be moved to contact a user's skin.

The sensor unit 400 may include a light emitting portion 410 for emitting light to the outside, and a light receiving portion 420 for sensing light when the light emitted from the light emitting portion 410 is reflected from a user's body (e.g., a user's wrist). The number of the light emitting portion 410 and the light receiving portion 420 is not limited.

Figure 4B:
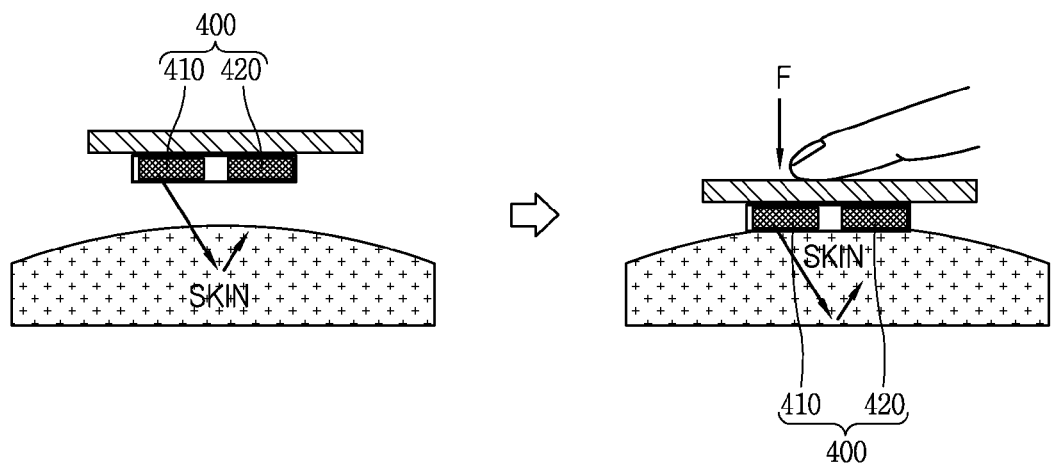
Figure 4C:
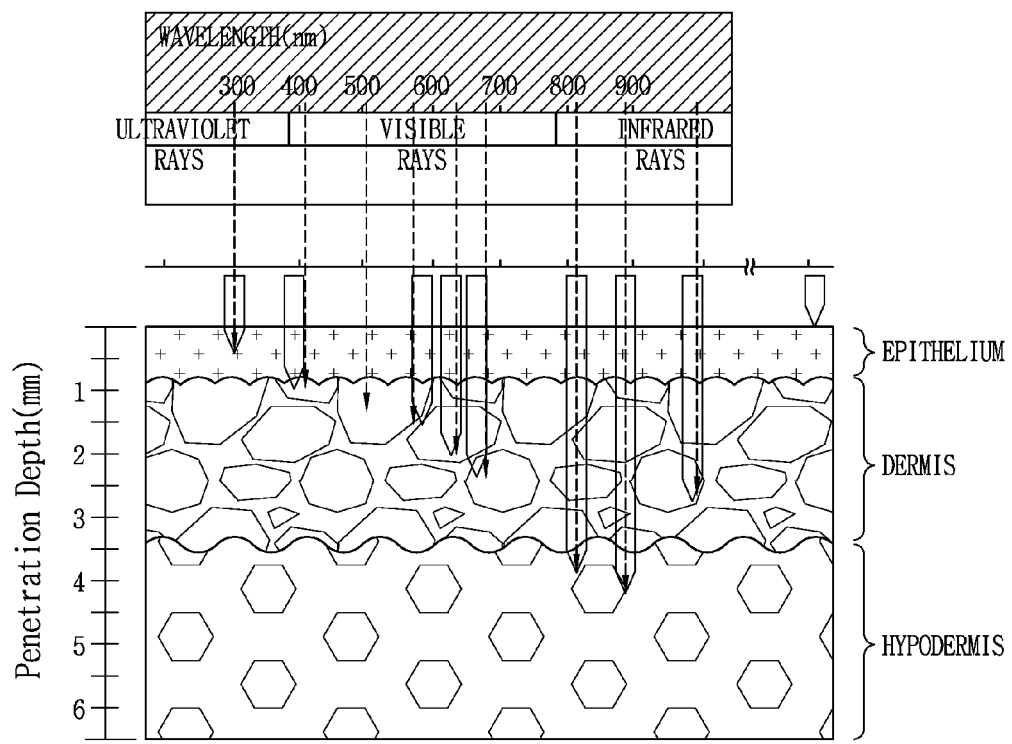

Referring to FIG. 4C, the light emitting portion 410 may be configured as at least one of an LED for emitting light of a specific color, and an IR LED for emitting infrared rays. Visible rays may penetrate a deeper region of the skin as a wavelength thereof is longer. A green ray having a relatively short wavelength penetrates only the epithelium, whereas a red ray having a relatively long wavelength penetrates the inner skin (dermis). Infrared rays having a longer wavelength than visible rays penetrate up to the hypodermis.

The light emitting portion 410 emits light of a first intensity (S210). The intensity of light emitted from the light emitting portion 410 may be proportional to a value of an output current. The light may correspond to green light and/or infrared light. The light emitting portion 410 emits the light of a first intensity at specific time intervals. The controller 180 determines whether the watch-type mobile terminal 100 has been worn on a user's wrist (or user's body) or not, based on the light of the first intensity sensed by the light receiving portion 420 (S220).

If the watch-type mobile terminal 100 has been worn on the wrist, at least part of the light of a first intensity is reflected from the user's body (the skin). Once the reflected light is incident onto the light receiving portion 420, the controller 180 determines that the watch-type mobile terminal 100 has been worn on the user's body. On the other hand, if the reflected light is not incident onto the light receiving portion 420, the controller 180 determines that the watch-type mobile terminal 100 has not been worn on the user's body.

Figure 4D:
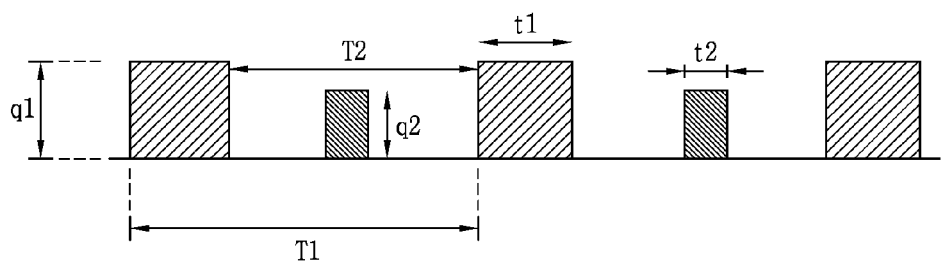

Referring to FIG. 4D, the light emitting portion 410 emits light of a first intensity (q1) with a first time interval (T1). The light of the first intensity (q1) may be emitted for a first time (t1). The light of the first intensity (q1) may correspond to green light and/or infrared light. The controller 180 may execute a specific function based on whether the watch-type mobile terminal 100 has been worn or not.

The controller 180 controls the light emitting portion 410 to emit the light of the first intensity (q1) (S230). If it is determined that the watch-type mobile terminal 100 has been worn, the controller 180 may control the light emitting portion 410 to emit light of a second intensity (q2) after emitting the light of the first intensity (q1). Alternatively, while the watch-type mobile terminal 100 is turned on, the light emitting portion 410 may regularly output the light of the first intensity and the light of the second intensity.

Referring back to FIG. 4D, the light of the second intensity (q2) is output when the light of the first intensity (q1) is not output. The second intensity (q2) is set to have a different size from the first intensity (q1), and the light of the second intensity (q2) is output with a second time interval (T2) for a second time (t2).

Preferably, the second time (t2) is set to be shorter than the first time (t1), and the second intensity (q2) is set to be lower than the first intensity (q1). If the second intensity (q2) and a time duration for which the light of the second intensity (q2) is output are more than reference values, an amount of sensed light may be the same when a pressure value is increased. That is, if the second intensity (q2) and the second time (t2) are more than the reference values, even if an applied pressure is changed, the same amount of light is sensed by the light receiving portion. This may cause a change of a pressure value according to a light receiving amount, not to be measured. Therefore, it is preferable that the second time (t2) is set to be shorter than the first time (t1), and the second intensity (q2) is set to be lower than the first intensity (q1). However, the second intensity (q2) and the second time (t2) may be changed according to a skin color of a user who wears the watch-type mobile terminal 100 according to an embodiment of the present invention. This will be explained in more detail with reference to FIG. 5A.

Preferably, the light of the first intensity (q1) and the light of the second intensity (q2) are output in an alternate manner. Preferably, an output period of the light of the first intensity (q1) is set to be the same as that of the light of the second intensity (q2). The light of the second intensity (q2) may correspond to green light or infrared light.

Infrared light is not sensed by naked eyes while it is being output, and penetrates the epithelium or dermis. On the other hand, green light is sensed by naked eyes when it flickers at specific time intervals. Thus, light flickers continuously when there is a gap between the light emitting portion 410 and the skin, or when the watch-type mobile terminal 100 has not been worn. Further, when the green light reaches the epithelium and then is reflected to be sensed by the light receiving portion, it may be influenced by noise due to a pulse wave of the epithelium or a heartbeat (heart rate). If the light of the second intensity (q2) is implemented as green light, an error may occur in calculating a pressure value based on a light receiving amount.

Thus, the light of the second intensity (q2), output at specific time intervals is preferably implemented as infrared light for calculation of a pressure value.

The first intensity (q1) may be about 50 mA, the second intensity (q2) may be about 30 mA, the first time (t1) may be about 7.5 μs, and the second time (t2) may be about 4 μs. However, the present invention is not limited to such values, and the values may be changed by a user's setting.

The controller 180 calculates a pressure value based on an amount of reflected light sensed by the light receiving portion 420 (S240), and executes a specific function based on the pressure value (S250). Pressure may be applied onto the display unit 151, and a touch sensor included in the display unit 151 may sense a touch input while the pressure is being applied. The controller may execute a specific function based on a touch position on the display unit 151 and a pressure value applied onto the display unit 151.

Referring to FIG. 4B, light output toward the skin is reflected from the skin, thereby being incident onto the light receiving portion 420. When a pressure (F) is supplied from the outside, the light emitting portion 410 and the light receiving portion 420 come in contact with the skin as the watch-type mobile terminal 100 or the sensor unit 400 is moved. As the light emitting portion 410 and the light receiving portion 420 are moved closer to the skin, an amount of received light is more increased.

If only the light of the first intensity (q1) is output, the same amount of light is received irrespective of a contacted degree of the light receiving portion 420 to the skin. Thus, in the case where only the light of the first intensity (q1) is output, a pressure applied onto the display unit 151 is not sensed. If a distance between the sensor unit 400 and the skin is changed by an external force while the light of the second intensity (q2) is output, an amount of received light is changed and thus a change of a pressure value may be measured.

Figure 4E:
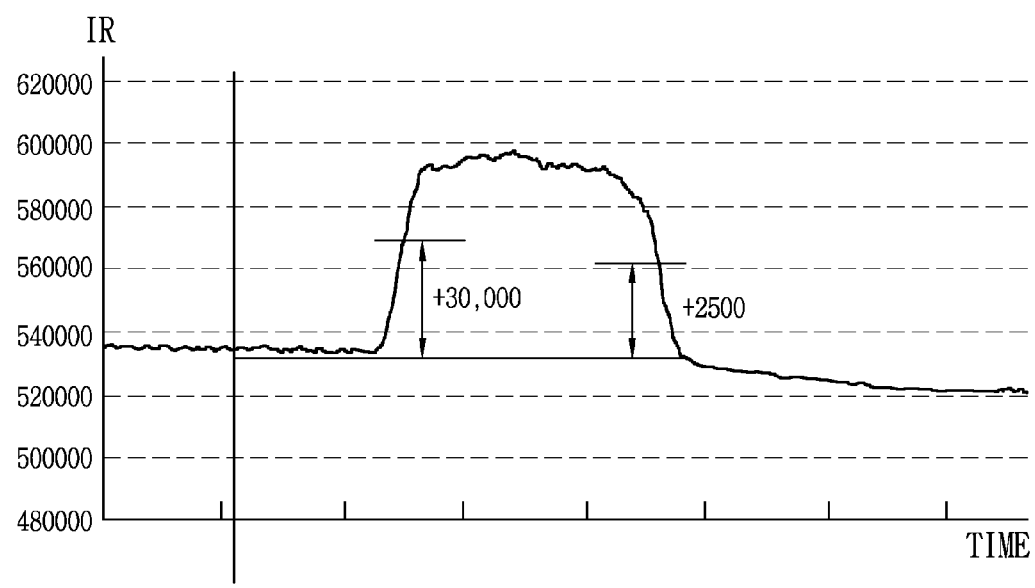

Referring to FIG. 4E, the controller 180 determines a pressure size according to an amount of light incident by the light receiving portion 420 (S420). The controller 180 distinguishes a pressure touch and a general touch from each other, based on a reference optical amount. The pressure touch means a touch input applied onto the display unit 151 with a pressure more than a reference value, whereas the general touch means a touch input applied onto the display unit 151 with a pressure less than a reference value.

FIG. 4E is a graph illustrating a change of an amount of infrared rays received while a pressure is applied onto the display unit 151. While a pressure touch is applied to be released, an amount of light incident onto the light receiving portion is increased to be decreased.

If a difference between an initial light receiving amount and a light receiving amount measured while a pressure is applied/released is more than a first reference value (e.g., about 30000 mA), the controller 180 may determine that a pressure touch has been applied. On the other hand, if the difference is less than a second reference value (e.g., about 2500 mA) less than the first reference value, the controller 180 may determine that a general touch has been applied. The first and second reference values may be differently set, and may be changed by a user.

In this embodiment, the same sensor is used to sense whether the watch-type mobile terminal has been worn and to generate a control command based on a pressure change. That is, since a sensor for sensing whether the watch-type mobile terminal has been worn or not is used to measure a pressure applied by a user, an additional sensor unit for executing a different function and a control device for calculating a pressure value are not required. Since an inner space for mounting the additional sensor unit and the control device is not required, the thickness of the mobile terminal may be minimized, and the fabrication cost of the mobile terminal may be reduced.

Light emitted from the light emitting portion 410 may be reflected from or absorbed into the skin according to a state of the skin onto which the light is incident. Especially, an amount of light incident onto the light receiving portion 420 may be variable according to a skin color. Hereinafter, will be explained a method of controlling an intensity of light to be output (a current value) according to a skin color, in order to precisely measure a pressure value.

Figure 5A:
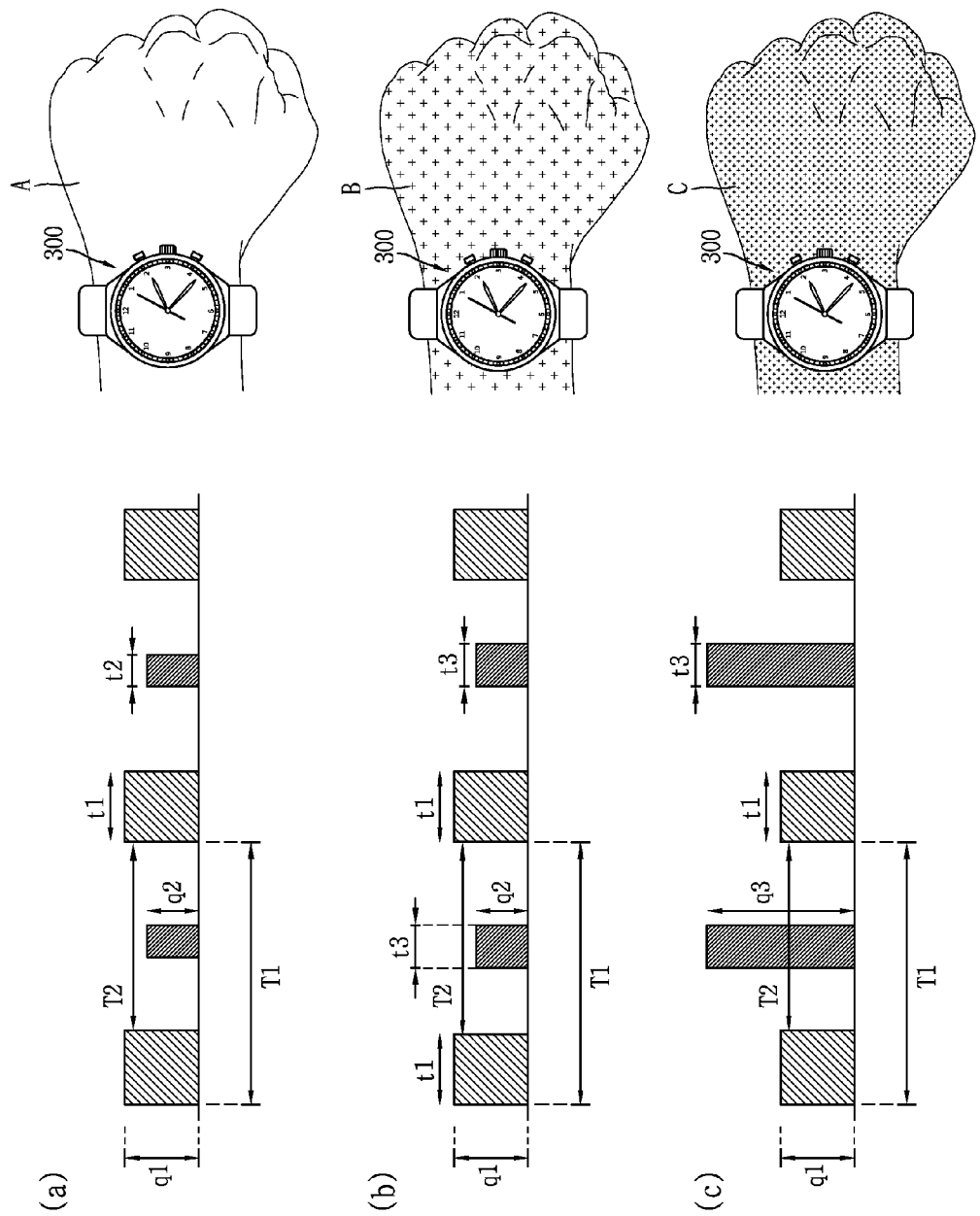
FIG. 5A is a conceptual view illustrating a method of controlling a light emitting amount based on a skin color, according to an embodiment of the present invention.
Figure 5B:
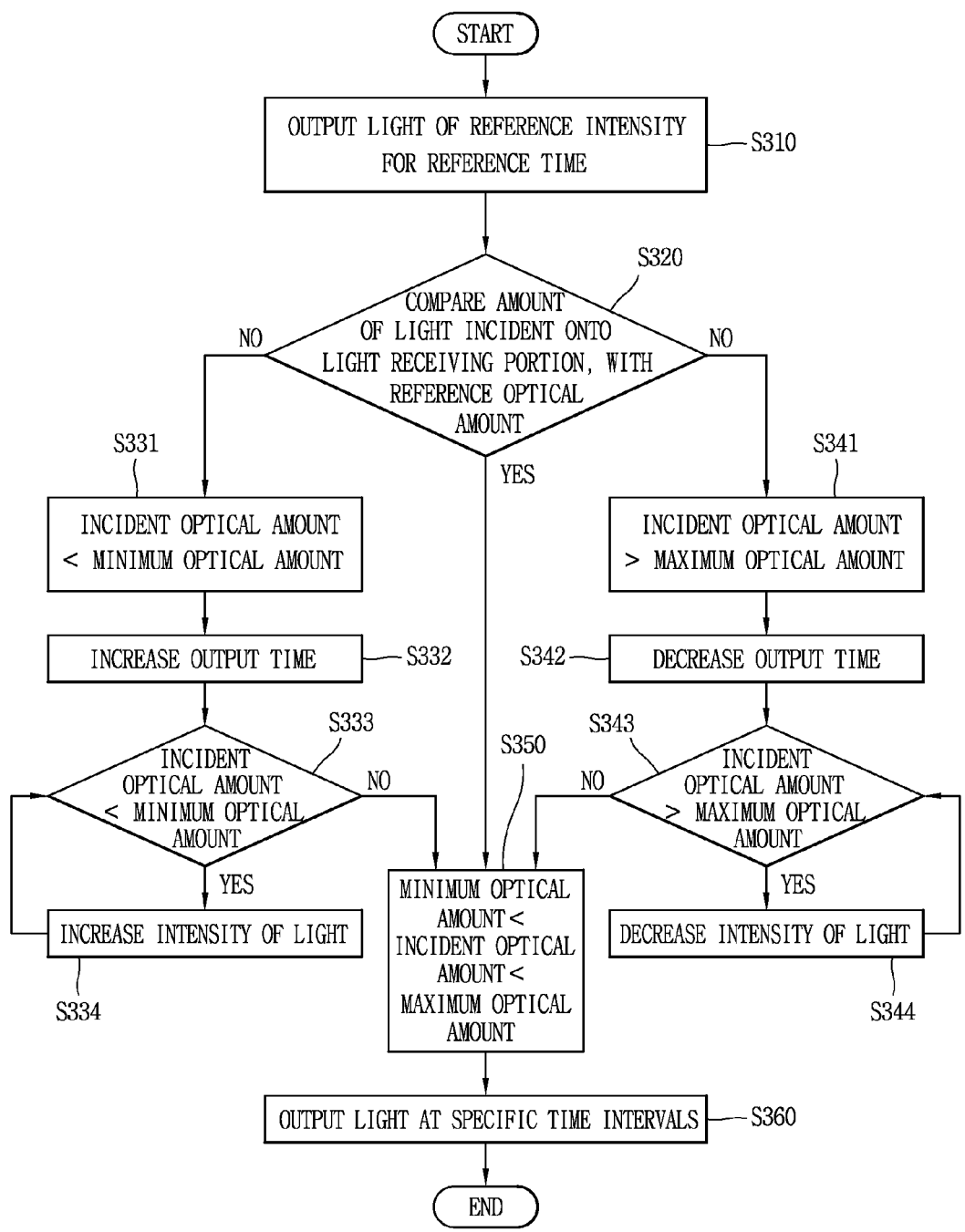
FIG. 5B is a conceptual view illustrating a method of controlling a light emitting amount based on an amount of received light.

FIG. 5A is a conceptual view illustrating a method of controlling a light emitting amount based on a skin color, according to an embodiment of the present invention. FIG. 5B is a conceptual view illustrating a method of controlling a light emitting amount based on an amount of received light.

FIG. 5A(a) illustrates light emission when the watch-type mobile terminal 100 has been worn on a wrist of a first skin (A). FIG. 5A(b) illustrates light emission when the watch-type mobile terminal 100 has been worn on a wrist of a second skin (B). FIG. 5A(c) illustrates light emission when the watch-type mobile terminal 100 has been worn on a wrist of a third skin (C).

Each of the first to third skins (A, B, C) has a different color so as to indicate a different reflectivity and a different absorption rate. It is defined that the third skin (C) has a higher absorption rate than the first and second skins (A, B), and the second skin (B) has a higher absorption rate than the first skin (A). The darker the skin is, the more increased an absorption rate is.

Referring to FIG. 5A(a), the light emitting portion 410 outputs light of the first intensity (q1) with a first time interval (T1), and outputs light of the second intensity (q2) with a second time interval (T2). The second intensity (q2) may be set to be lower than the first intensity (q1). The light of the first intensity (q1) and the light of the second intensity (q2) are output in an alternate manner. The light of the first intensity (q1) is output for a first time (t1), and the light of the second intensity (q2) is output for a second time (t2).

Referring to FIG. 5A(b), the light emitting portion 410 emits the light of the first intensity (q1) with the first time interval (T1) for the first time (t1), and emits the light of the second intensity (q2) with the second time interval (T2) for a third time (t3). That is, if an absorption rate to the skin is reduced, the controller 180 may increase an output time of the light of the second intensity (q2) to obtain reflected light. For instance, the second time (t2) may be about 4 μs, and the third time (t3) may be about 7 μs.

Referring to FIG. 5A(c), the light emitting portion 410 may emit light of a third intensity (q3) for a third time (t3). The third time (t3) may be set to be larger than the second time (t2). For instance, if the second intensity (q2) is about 4 mA, the third intensity (q3) may be about 7 mA.

The controller 180 may increase an intensity and an output time of light, based on a reflected degree of the light according to a skin color. The controller 180 may increase or decrease the intensity and the output time of light, independently or together.

As the skin from which light is reflected has a dark color, the controller 180 controls the light emitting portion 420 to increase an intensity of light to be output when a reflection rate is low. The light of the first intensity (q1) is output for the first time (t1), and the light of the second intensity (q2) is output for the second time (t2). That is, the controller 180 outputs infrared light with a larger current when a reflection rate is low as a user's skin from which the light is reflected has a dark color.

Thus, a minimum pressure and a maximum pressure to be applied may be calculated based on an amount of light incident onto the light receiving portion by being reflected. The watch-type mobile terminal 100 may output light based on an intensity and a time which are set by a user, among a plurality of reference optical amounts.

Referring to FIG. 5B, will be explained a step of controlling an intensity and an output time of light in order to calculate a pressure value. The controller 180 outputs a preset amount of light for a preset time (S310). The controller 180 compares an amount of light incident onto the light receiving portion 420, with a reference optical amount (S320). The reference optical amount is composed of a minimum optical amount and a maximum optical amount which are incident onto the light receiving portion with different values such that a user's pressure is sensed.

If the amount of light incident onto the light receiving portion 420 is between the minimum optical amount and the maximum optical amount (S350), the controller 180 outputs light of a preset intensity at preset time intervals (S360).

If the amount of light incident onto the light receiving portion 420 is smaller than the minimum optical amount (S331), a change in the optical amount due to a pressure change cannot be sensed. The controller 180 increases an output time of the light of the preset intensity (S332).

Then, the controller 180 compares the preset optical amount with an incident optical amount. If the incident optical amount is still smaller than the minimum optical amount (S333), the controller controls the light emitting portion 410 to increase the intensity of the light (S334). The controller 180 compares the incident optical amount with the minimum optical amount, with increasing the intensity of the light. If the incident optical amount is equal to or larger than the minimum optical amount and is smaller than the maximum optical amount, the controller outputs light of a changed intensity at specific time intervals (S360).

If the incident optical amount is larger than the maximum optical amount (S341), a change in the optical amount may not be sensed because an amount of light reflected from the skin is too large. In this case, the controller 180 decreases an output time of the light of the preset intensity (S342).

Then, the controller 180 compares the preset optical amount with the incident optical amount. If the incident optical amount is still smaller than the maximum optical amount (S343), the controller controls the light emitting portion 410 to decrease the intensity of the light (S344). The controller 180 compares the incident optical amount with the maximum optical amount, with decreasing the intensity of the light. If the incident optical amount is equal to or smaller than the maximum optical amount and is larger than the minimum optical amount, the controller outputs light of a changed intensity at specific time intervals (S360).

In this embodiment, since an intensity and an output time of light are determined based on data obtained by reflecting light to a user's body on which the watch-type mobile terminal 100 has been worn, a step individually set by a user may not be required, and an intensity of light and an output time by which a pressure value is measured more precisely may be determined.

Figure 6A:
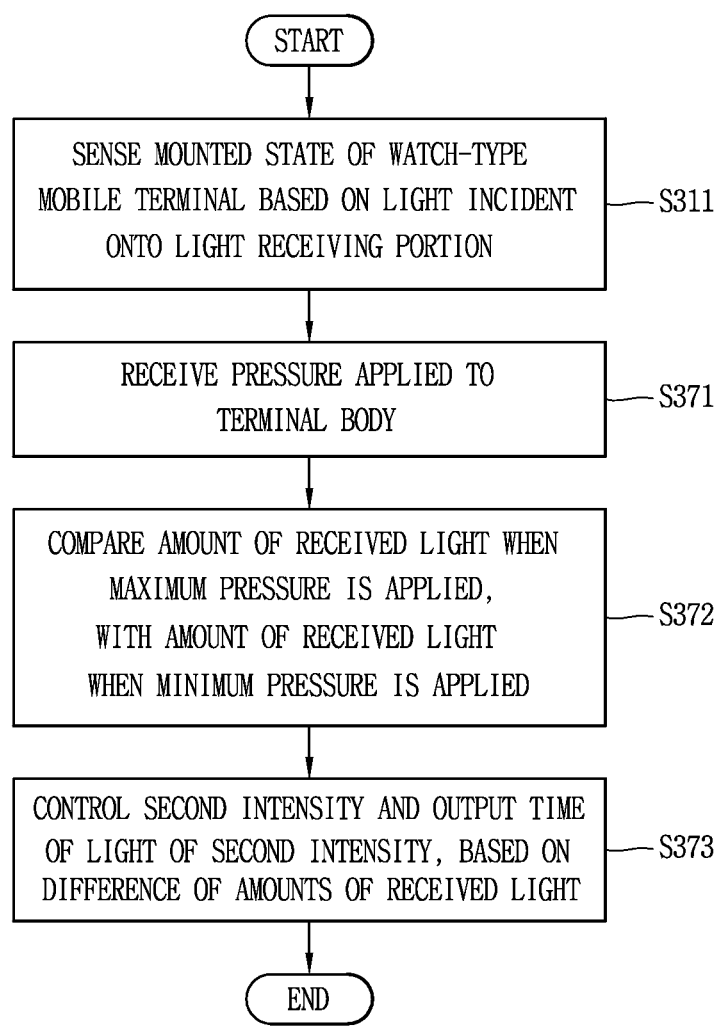
FIGS. 6A to 6C are conceptual views illustrating a method of controlling an amount of light to be output, based on a pressure applied to a mobile terminal.

FIG. 6A is a flowchart illustrating a method of controlling an intensity of light to be output, based on a pressure applied to the mobile terminal. And FIG. 6B is a conceptual view illustrating the control method of FIG. 6A.

The controller 180 sensed whether the watch-type mobile terminal 100 has been worn or not, based on light incident onto the light receiving portion 420 (S311). If it is determined that the watch-type mobile terminal 100 has been worn on a user's wrist (a user's body), the controller 180 receives a pressure applied to the terminal body 101 (S371). In this case, the display unit 151 may output guide information for guiding input of a pressure.

Figure 6B:
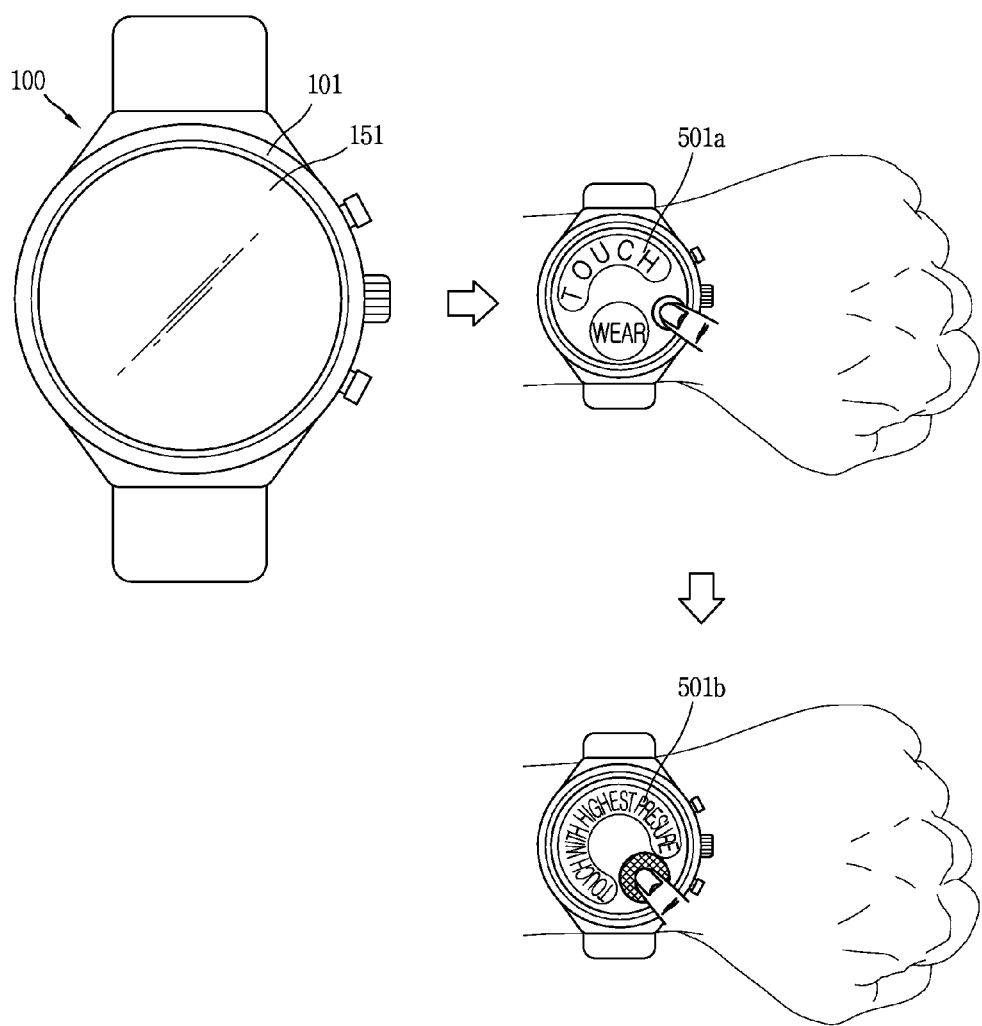

Referring to FIG. 6B, the display unit 151 outputs a first guide image 501a for guiding a touch input having a minimum pressure. While the touch input is applied, the controller 180 measures an amount of light sensed by the light receiving portion 420. The display unit 151 outputs a second guide image 501b for guiding a touch input having a maximum pressure.

While the touch input having a maximum pressure is applied, the controller 180 measures an amount of light sensed by the light receiving portion 420. And the controller 180 compares a light receiving amount when the minimum pressure is applied, with a light receiving amount when the maximum pressure is applied (S372). If the applied pressures are distinguished from each other as a plurality of inconsecutive values, the controller 180 may check a change in a light receiving amount while pressure values from the minimum pressure to the maximum pressure are applied.

The controller 180 controls a second intensity and an output time of light of the second intensity, based on a difference of the light receiving amounts (S373).

In this embodiment, an optimum intensity and an optimum output time of light may be determined in order to recognize an intensity of a pressure applied by a user. This may allow the sensor unit to be controlled so as to be suitable for a force or a habit of a user who wears the watch-type mobile terminal 100.

Figure 6C:
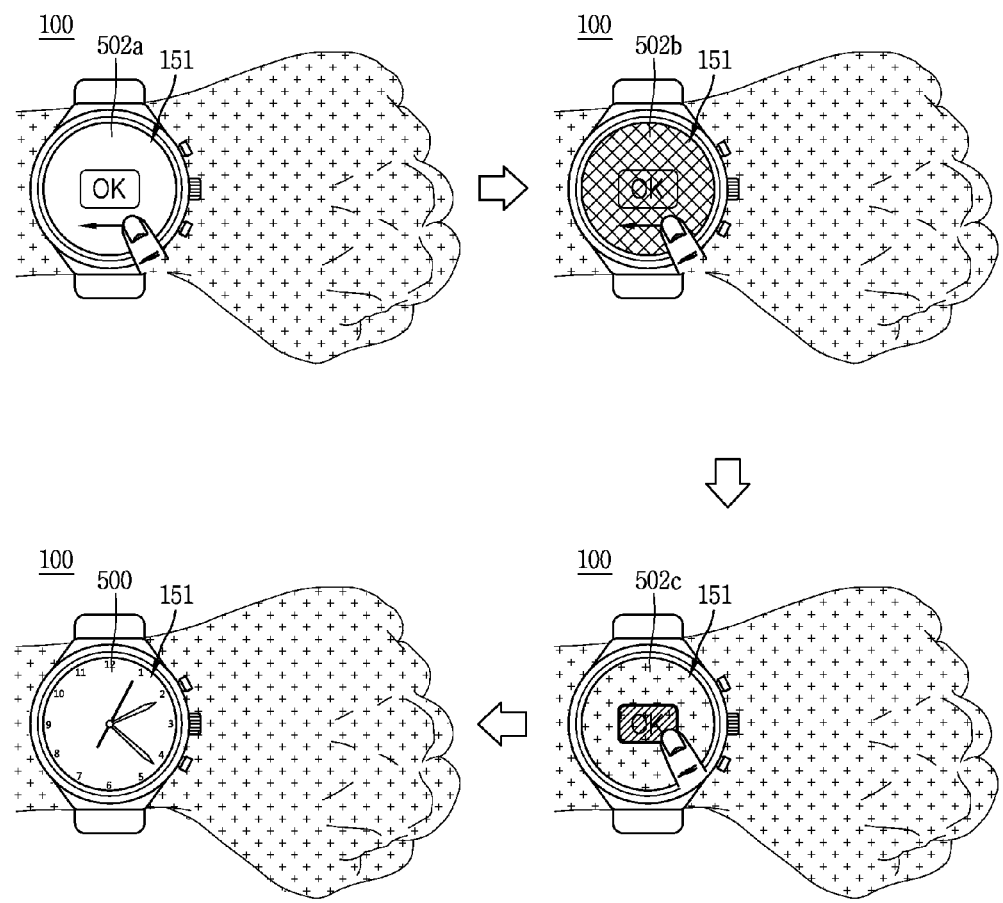

Referring to FIG. 6C, will be explained a method of controlling a light intensity suitable for a user's skin color. In this embodiment, the memory 170 stores therein a plurality of reference information according to reflectance values of different skin colors. The reference information includes information about an intensity of light, an output time and an output interval, for sensing of a pressure. The memory 170 stores therein images indicating skin colors, together with the reference information.

If it is determined that the watch-type mobile terminal 100 has been worn, the display unit 151 outputs a first image 502a among a plurality of images. The first image 502a may be an image corresponding to selected reference information when the watch-type mobile terminal 100 has been worn, or may be a reference image.

The first image 502a indicating a skin color may not include specific information. The first image 502a may indicate a brightest skin color or a darkest skin color, or may be an image corresponding to a previous skin color. The memory 170 may store therein user information distinguished from each other, as well as the reference information and the reference image. Although not shown, the controller 180 may control the light emitting portion 410 to output light as reference information based on inputted user information.

The controller 180 may sequentially output a second image 502b and a third image 502c, based on a touch input applied to the first image 502a. The first to third images 502a, 502b, 502c correspond to different reference information. The touch input may be a dragging type of touch input applied to a specific direction.

The controller 180 controls the light emitting portion 410, based on reference information corresponding to the third image 502c selected based on a touch input applied to an icon on the display unit 151. Upon selection of the image, the controller 180 controls the light emitting portion 410 to emit light based on the reference information, and measures a pressure value based on light sensed by the light receiving portion 420.

If the third image 502c is selected and the light emitting portion 410 is controlled, the display portion 151 outputs an initial screen 500. The initial screen 500 may be a home screen page indicating a time, including event information, or including information (an icon) of a specific application. However, the initial screen 500 is not limited to the home screen page, and may be variable by a user's setting.

In this embodiment, in a state where the watch-type mobile terminal 100 has been worn, a user may select an image the most similar to his or her skin color, and may set a sensing condition (an intensity of light, an output time of light, and an output interval for sensing a pressure change) suitable for the skin color. This may allow a suitable control method based on a pressure change, to be implemented.

Figure 7A:
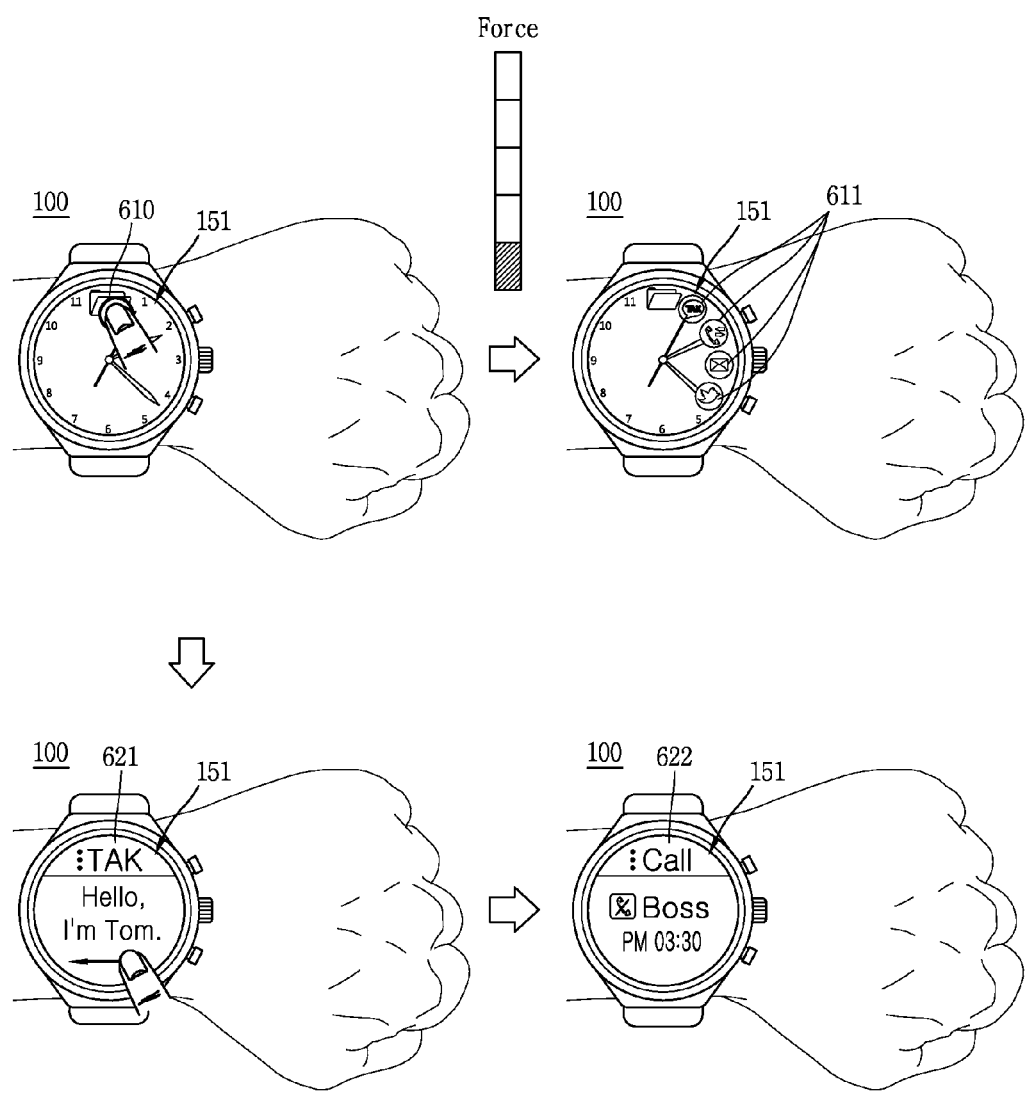
FIGS. 7A and 7B are conceptual views illustrating a method of controlling a mobile terminal based on a pressure, according to an embodiment of the present invention.
Figure 7B:
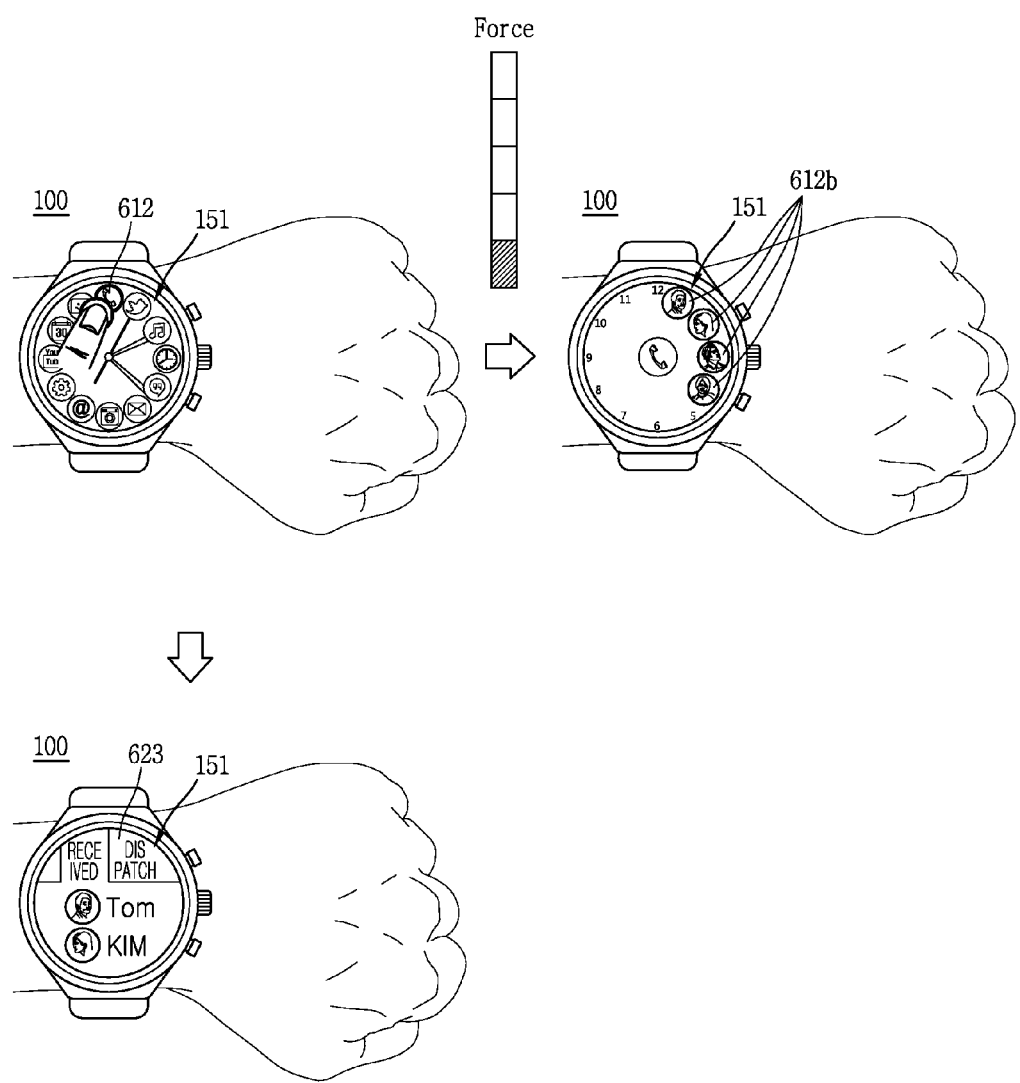

FIGS. 7A and 7B are conceptual views illustrating a method of controlling the mobile terminal based on a pressure value, according to an embodiment of the present invention.

Referring to FIG. 7A, the controller 180 executes a different function by recognizing a touch pressure applied to the same graphic image displayed on the display unit 151. For instance, the display unit 151 outputs an event notification image 610 indicating occurrence of an event, to an initial screen including numeric information indicating time. The event notification image 610 may be displayed on a single number.

If a pressures touch is applied to the event notification image 610, the controller 180 controls the display unit 151 to output different icons 611 of applications including notification information of an event. The icons 611 may be displayed on different numbers. If it is sensed that the pressure touch has been applied with a pressure value more than a specific value, the controller 180 may output the icons 611 in an unfolded manner from the event notification image 610.

In the drawings, the pressure value corresponds to a first stage among four stages. However, the pressure value for outputting the icons 611 is not limited to this.

Although not shown, a larger number of icons may be output in order of recently-received event, based on a change degree of a pressure value. That is, as a higher pressure value is sensed, a larger number of icons may be output.

If the same pressure touch is applied to the event notification image 610, the controller 180 may control the icons 611 to disappear from the display unit 151.

If a general touch is applied to the event notification image 610, the controller 180 outputs a first notification screen 621 corresponding to an event received firstly or the most recently. In this case, if a dragging type of touch input is applied to the first notification screen 621, the controller 180 controls the display unit 151 to output a second notification screen 622 corresponding to another event.

In this embodiment, different types of visual information including event-related information may be provided based on a touch input applied to an icon corresponding to a received (occurred) event with a different pressure. Thus, a user may be provided with event-related information in a desired manner, by applying a different type of touch.

Referring to FIG. 7B, the display unit 151 outputs a home screen page 612 including a plurality of icons. The controller 180 outputs an execution screen 623 corresponding to an icon selected from the plurality of icons based on a touch input. The plurality of icons may be displayed on numbers indicating time.

The controller 180 may output at least one graphic image for executing a selected application, based on a pressure touch applied to one of the plurality of icons with a pressure value more than a reference value. For instance, if a selected icon is related to a call function, the controller 180 may output at least one contact information 612b for executing the call function, based on the pressure touch. Although not shown, the controller 180 may control the display unit 151 to output different information related to a call function, based on a pressure touch having a different pressure value. If a touch input is applied to the contact information, the controller 180 may originate a call to the corresponding contact information.

In this embodiment, a user may sequentially check detailed information included in a specific image by using a pressure touch, and may execute a different function based on a touch type.

FIGS. 8A to 8D are conceptual views illustrating a method of outputting different information according to a pressure value.

Figure 8A:
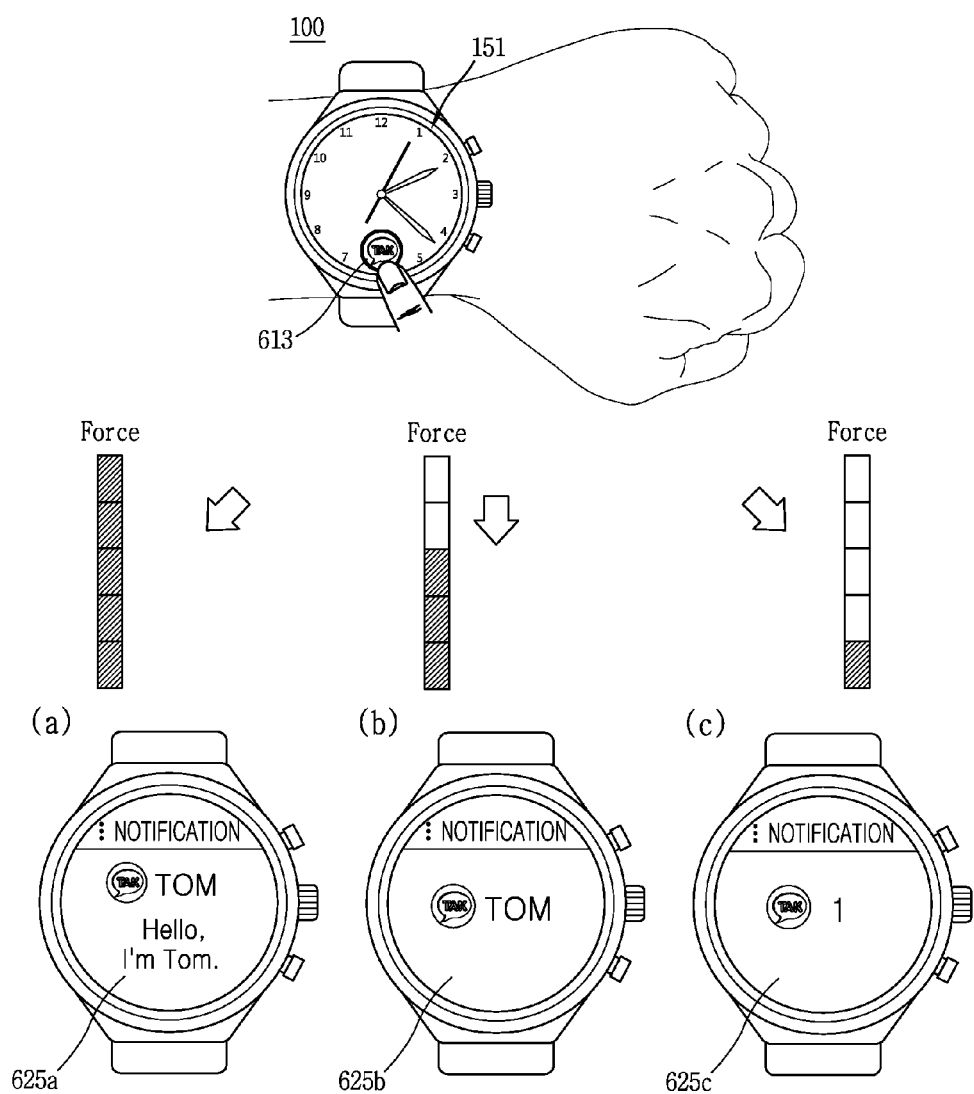

Referring to FIG. 8A, the controller 180 outputs an icon 613 corresponding to a specific application. When an event related to the application is received, the icon 613 may be output to one region of the display unit 151 so as to notify the reception of the event.

Referring to FIG. 8A(a), if a pressure touch has a first pressure value, the controller 180 outputs detailed information 625a related to the event. For instance, the pressure value may be a maximum pressure. The detailed information 625a may include information about an event content, an event-received time point, an event source, an event-generated external device, etc. However, the present invention is not limited to this.

Referring to FIG. 8A(c), if a pressure touch having a minimum pressure value is applied, the controller 180 controls the display unit 151 to output minimum information about the application (625c). The minimum information 625c may include information about the number of received events and application-related information. However, the present invention is not limited to this. Most of information included in the minimum information 625c may be included in the detailed information 625a.

Referring to FIG. 8A(b), if a pressure touch having an intermediate pressure value is applied, the controller 180 controls the display unit 151 to output basic information of the event (625b). The basic information 625b may include information about an event-transmitted external device, information about the number of received events, application-related information, etc. The controller 180 may control the display unit 151 to output the basic information 625b and the detailed information 625a when an additional pressure touch is applied in a state where the minimum information 625c has been output.

In this embodiment, since information about the same event is provided in order of the amount based on a pressure touch applied to the watch-type mobile terminal, a user may receive desired number of information by applying a pressure. Further, a user may be provided with desired event-related information without executing an application.

Figure 8B:
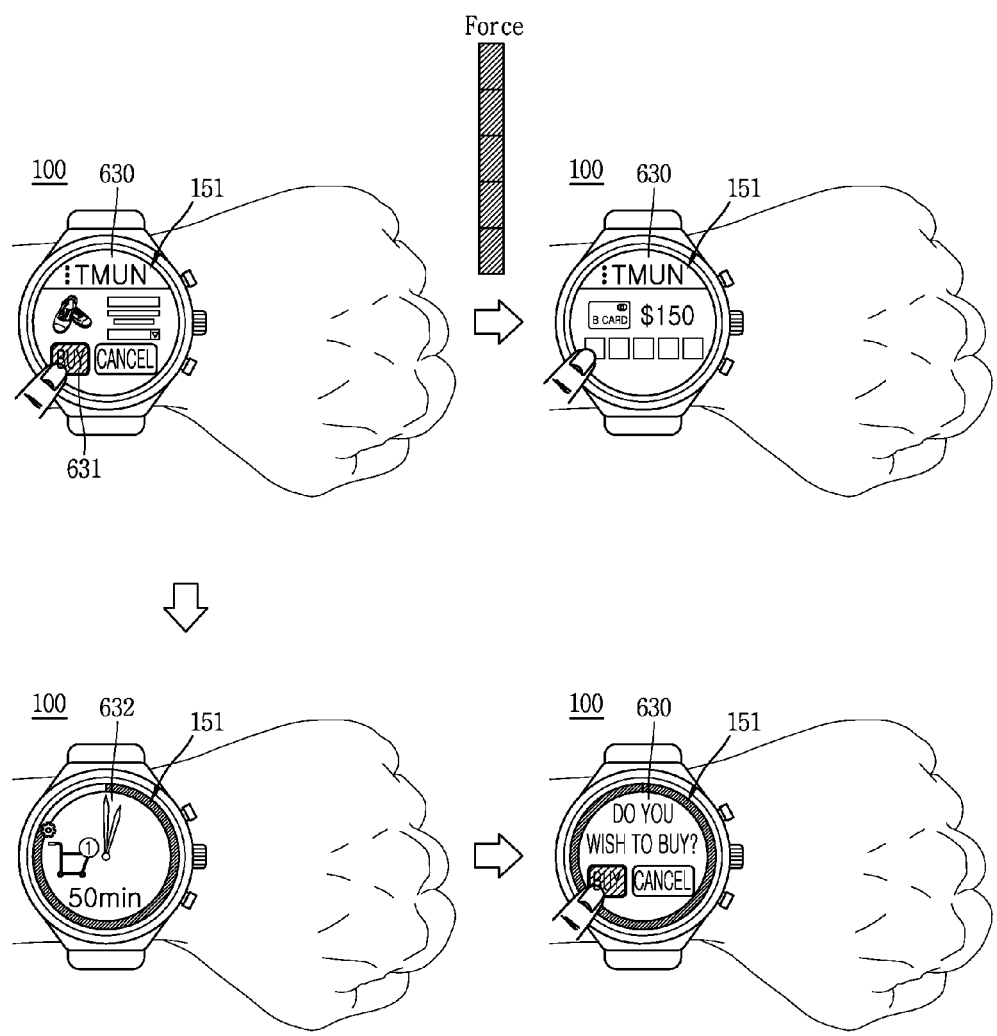

Referring to FIG. 8B, the controller 180 may omit a plurality of control steps for executing a preset function and may immediately execute the function, based on a pressure touch. If an application for purchasing products is being executed, the display unit 151 outputs a purchase screen 630. The purchase screen 630 may include a graphic image 631 for executing purchase.

If a pressure touch having a specific pressure value is applied to the graphic image 631, the controller 180 outputs a payment screen 630.

If a general touch is applied to the graphic image 631, the controller 180 controls the display unit 151 to output a purchase standby screen 632. The purchase standby screen 632 means a screen to wait for a control command by a user's purchase intention for a specific time, and may include an indicator changed as time lapses.

If the specific time lapses, the controller 180 may re-output the purchase screen 630 including a graphic image for confirming the purchase. If a pressure touch having a pressure value is applied, a payment step is immediately executed without a purchase standby step. On the contrary, if a general touch is applied, a step of waiting for purchase for a specific time is executed.

In this embodiment, in a case where a purchase function to confirm a user's intention to purchase is executed, when a pressure touch having a pressure value more than a reference value is sensed, the purchase function is executed, in order to confirm that the pressure touch applied onto the display unit corresponds to a control command by a user's intention to purchase. On the other hand, if a general touch not having a pressure value more than a reference value is sensed, a step of re-confirming a user's intention to purchase is executed. This may prevent a user from applying a purchase control command by mistake or unintentionally.

Figure 8C:
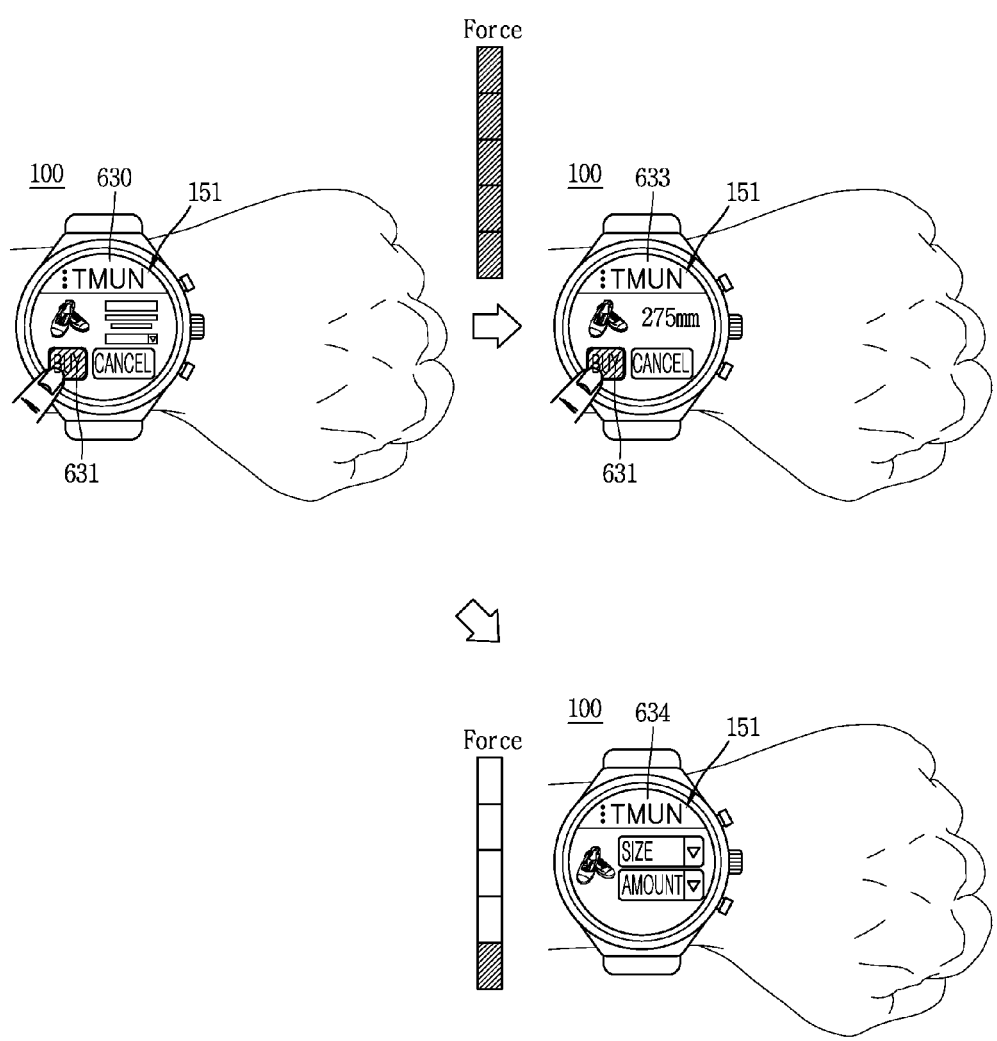

Referring to FIG. 8C, the controller 180 provides different information based on a pressure touch having a different pressure value. The display unit 151 outputs a purchase screen 630 related to a specific item.

If a pressure touch having a first pressure value is applied, the controller 180 outputs a purchase screen 633. On the other hand, if a pressure touch having a second pressure value smaller than the first pressure value is applied, the controller 180 controls the display unit 151 to output detailed information of the item. For instance, the detailed information 634 may include graphic images for selecting detailed information about purchase before the purchase screen 633.

The controller 180 controls the display unit 151 to sequentially output the detailed information 634 and the purchase screen 633, based on a pressure value of the pressure touch.

In the present invention, a user may execute a desired function more rapidly, since a plurality of steps for executing a single function are omittable based on a pressure value of a pressure touch.

Referring to FIG. 8D, will be explained a method of changing a sorting basis of information based on a pressure value. The display unit 151 outputs screen information 670 including a plurality of information. The controller 180 provides the plurality of information in a sorted manner based on a user's setting. The plurality of information may be information about products on online shopping malls.

If a pressure touch having the first pressure value is applied, the controller 180 controls the display unit 151 to output a first sorting screen 671 where the information has been sorted based on a first reference. If a pressure touch having the second pressure value is applied, the controller 180 controls the display unit 151 to output a second sorting screen 672 where the information has been sorted based on a second reference.

The first and second references may be a title, a price (lowest price, highest price), reliability of a store, a purchase amount, etc. In this embodiment, in the watch-type mobile terminal having a small display region, information sorted based on a user's preferable reference may be efficiently provided. A pressure touch having a different pressure value may be applied consecutively or inconsecutively even in an output state of the sorting screen.

Figure 9A:
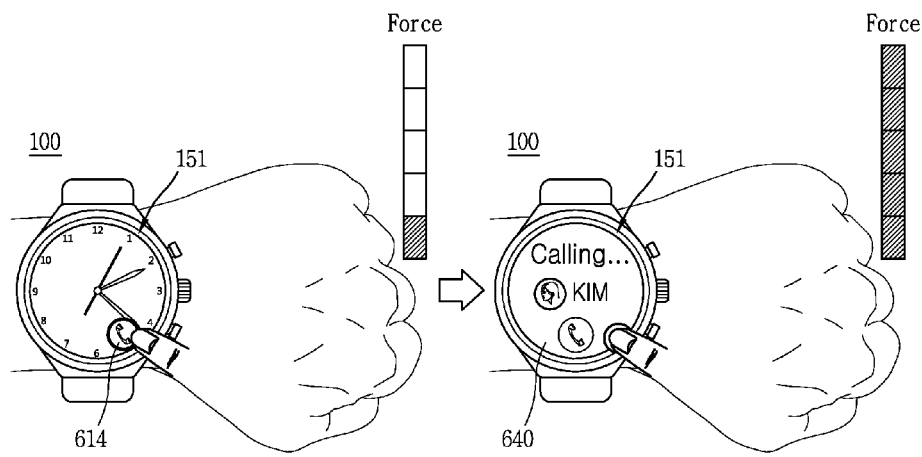
FIGS. 9A and 9B are conceptual views illustrating a method of controlling a mobile terminal based on a pressure value, according to an embodiment of the present invention.
Figure 9B:
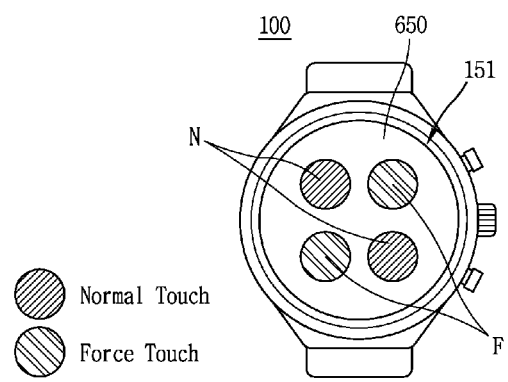

FIGS. 9A and 9B are conceptual views illustrating a method of controlling the mobile terminal based on a pressure value, according to an embodiment of the present invention.

Referring to FIG. 9A, the display unit 151 outputs an icon 614 of an application for executing a specific function. If a general touch having a pressure value less than a specific value or a pressure touch having a pressure value less than a reference value is applied, the controller 180 ignores the touch and blocks execution of the specific function. For instance, the specific function may be a function which considers a user's control intention, e.g., originating a call to an external device, changing a notification mode, etc.

If a pressure touch having a pressure value more than a preset value is applied, the controller 180 immediately executes a corresponding function.

In this embodiment, when an unintentional touch input is applied onto the display unit, execution of a corresponding function against a user's intention may be prevented.

Referring to FIG. 9B, an authentication method using a pressure touch will be explained. When the watch-type mobile terminal is in a locked mode, the controller 180 may execute an authentication process and release the locked mode, based on a touch input applied to a specific region on the display unit.

Authentication information for releasing the locked mode may be at least one specific region on the display unit, and a pressure value corresponding to the specific region. If a pressure touch having a pressure value is applied onto a locked screen 650, the controller 180 may output images of a different shape corresponding to the pressure value.

In this embodiment, since a user sets authentication information composed of a pressure touch (F) and a general touch (N), security may be enhanced.

FIGS. 10A to 10D are conceptual views illustrating a method of controlling a pressure touch-related function when the watch-type mobile terminal is not worn.

Referring to FIG. 4A additionally, in the watch-type mobile terminal, reflection of light cannot be executed unless the light emitting portion and the light receiving portion are adjacent to a region of a user's body. Hereinafter, will be explained a method of controlling a function when the watch-type mobile terminal 100 has not been worn, the function controlled based on a pressure touch applied when the watch-type mobile terminal 100 has been worn.

Figure 10A:
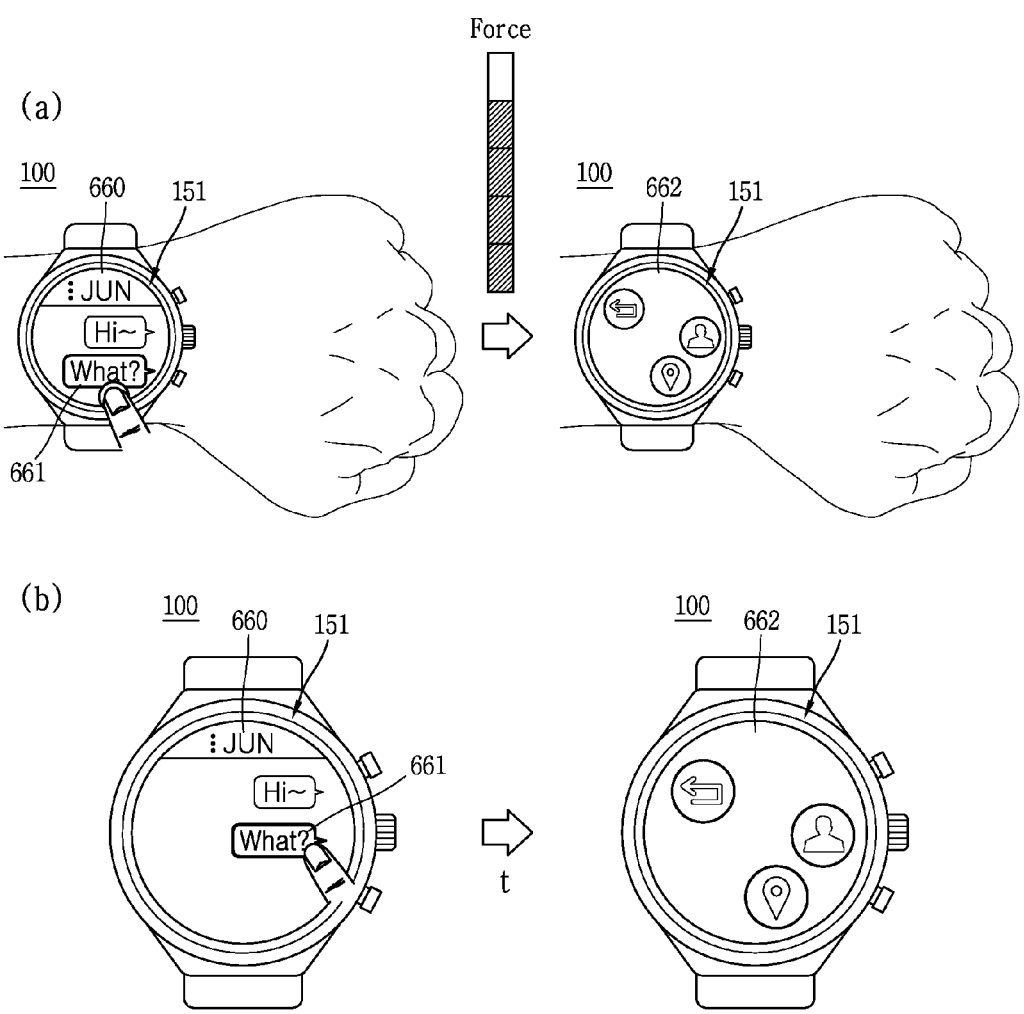

Referring to FIG. 10A(a), the display unit 151 outputs an execution screen 660 of a message application. The execution screen 660 includes received and transmitted dialogue information 661. If a pressure touch having a specific pressure value is applied to the dialogue information 661, the controller 180 controls the display unit 151 to output a function screen 662 for executing a function related to the dialogue information 661.

The function screen 662 includes graphic images corresponding to at least one function using the dialogue information 661. For instance, the function may be a function to output detailed information of an external device which has transmitted the dialogue information 661, a function to reply to the dialogue information 661, a function to send position information to another party of the dialogue information 661, etc.

Referring to FIG. 10A(b), when the watch-type mobile terminal 100 is not worn, a pressure value cannot be measured since there is no light incident onto the light receiving portion 420. Thus, even if a user applies a pressure onto the display unit 151, the specific function is not executed.

If a long touch is applied to the dialogue information 661 for more than a specific time (t, several seconds), the controller 180 controls the display unit to output the function screen 662. That is, if it is sensed by the sensor unit 400 that the watch-type mobile terminal 100 has not been worn, the controller 180 executes a preset function by corresponding a touch input having a specific pressure value to a long touch input applied for a specific time.

Thus, a user may execute a specific function which has been executed in a mounted (worn) state of the watch-type mobile terminal 100 by using a different method, even in a non-mounted (non-worn) state of the watch-type mobile terminal 100.

Referring to FIG. 10B(a), if it is sensed by the sensor unit 400 that the watch-type mobile terminal 100 has been worn on a user's wrist, the controller 180 executes a payment function based on a pressure touch having a specific pressure value and applied to a payment icon on a payment screen 635, and controls the display unit to output a payment completion screen 635a. The controller 180 may implement the specific pressure value as user's authentication information, and may execute a payment function without an additional authentication process when a pressure touch is applied.

Referring to FIG. 10B(b), if it is sensed by the sensor unit 400 that the watch-type mobile terminal 100 has not been worn on a user's wrist, the controller 180 does not execute a payment function even if a touch input is applied to the payment screen 635. The controller 180 outputs an authentication screen 651 when a general touch is applied to the payment screen 635. The authentication screen 651 may include touch information applied to a specific region, user's fingerprint information, text information, etc.

If an authentication process is completed by the authentication information, the controller 180 executes a payment function and outputs the payment completion screen 635a.

In this embodiment, in a case where a function which considers a user's intention is controlled based on a pressure touch, if the watch-type mobile terminal has not been worn, the function may be precisely executed through an additional step.

Figure 10C:
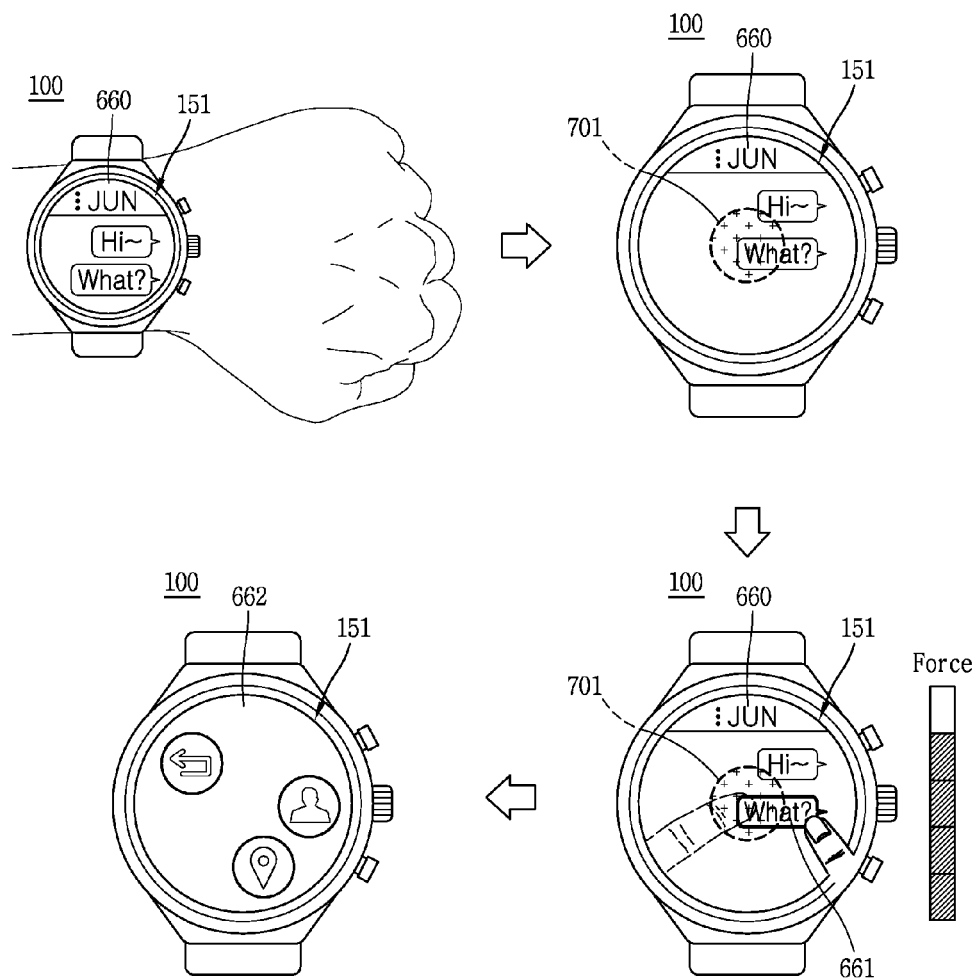

Referring to FIG. 10C, will be explained a control method when the watch-type mobile terminal has not been worn, in a case where there exists a control image for receiving a pressure touch such that a specific function is executed based on the pressure touch having a specific pressure value.

In a state where an execution screen 660 for a specific application has been output, if the watch-type mobile terminal 100 is converted into a non-worn state, the controller 180 outputs an indicator 701.

The indicator 701 is displayed on a region corresponding to the sensor unit 400 including the light emitting portion 410 and the light receiving portion 420. The indicator 701 indicates a region where a user should contact his or her finger (part of the body) on a rear surface of the terminal body. The controller 180 may output the indicator 701 if there is a function executed based on a pressure touch, when the watch-type mobile terminal 100 has not been worn. If the watch-type mobile terminal 100 is converted into a non-worn state, the indicator may disappear after being output for a specific time.

The controller 180 may execute a specific function, based on a pressure touch sensed after a finger or the like has contacted the sensor unit 400, in an output state of the indicator 701. Referring to FIG. 10C, a function screen 662 is output based on a pressure touch applied to the dialogue information 661.

If a pressure value is detectable as a finger or the like contacts the sensor unit 400, i.e., if light reflected from the skin reaches the light receiving portion 420, the controller 180 may change the shape of the indicator 701 or may control the indicator 701 to disappear from the display unit 151, in order to inform a detectable state of a pressure.

In this embodiment, the watch-type mobile terminal can be controlled even in a non-worn state, based on a pressure touch. A user may recognize a function control based on a pressure touch through an indicator, and may execute a body contact for a pressure touch.

Figure 10D:
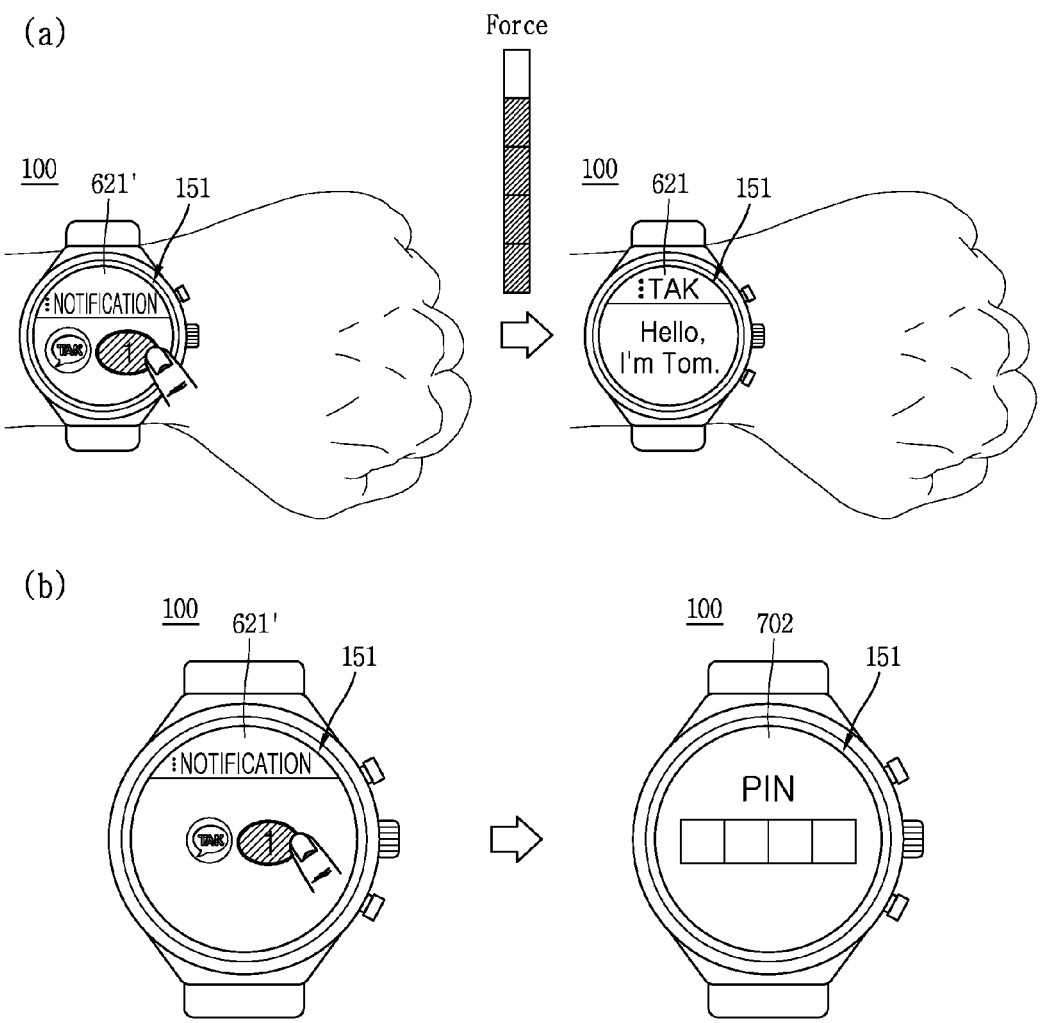

Referring to FIG. 10D(a), if it is sensed that the watch-type mobile terminal has been worn, the controller 180 receives a pressure touch applied to a notification screen 621' output to the display unit 151. The controller 180 controls the display unit 151 to output a first notification screen 621 based on a pressure touch having a specific pressure value.

Referring to FIG. 10D(b), if it is sensed that the watch-type mobile terminal has not been worn, the controller 180 cannot receive a pressure touch applied to the notification screen 621' output to the display unit 151. In this case, if a general touch is applied to the notification screen 621', the controller 180 controls the display unit 151 to output an authentication screen 702.

That is, the controller 180 may control a function which has been based on a pressure touch when the watch-type mobile terminal has been worn, based on authentication information on the authentication screen 702 when the watch-type mobile terminal has not been worn.

FIG. 11 is a conceptual view illustrating a method of controlling the mobile terminal based on a pressure touch according to another embodiment of the present invention.

Referring to FIG. 11, the display unit 151 outputs an execution screen 626 including a first graphic image 626a and a second graphic image 626b. For instance, the execution screen 626 may correspond to detailed information about one contact information (Tom). The first graphic image 626a may be an icon for originating a call to the contact information, and the second graphic image 626b may be an icon for outputting additional information.

Referring to FIG. 11(a), if a general touch (i.e., a touch having a pressure value less than a reference value) is applied to the first graphic image 626a, the controller 180 prevents execution of a function corresponding to the first graphic image 626a. That is, the controller 180 ignores the general touch applied onto the first graphic image 626a.

On the other hand, a general touch (i.e., a touch having a pressure value less than a reference value) is applied to the second graphic image 626b, the controller 180 controls the display unit 151 to output additional information 627.

Referring to FIG. 11(b), if a pressure touch (i.e., a touch having a pressure value more than a reference value) is applied to the first graphic image 626a, the controller 180 executes a function corresponding to the first graphic image 626a. For instance, the controller 180 may originate a call by using the contact information. Thus, the controller 180 may control the display unit 151 to output a call originating screen 628.

Although not shown, even when a pressure touch is applied to the second graphic image 626b, the controller 180 may execute a function corresponding to the second graphic image 626b.

In this embodiment, a function which considers a user's intention may be set to be executed only when a pressure touch having a specific pressure value applied from a user is applied. This may prevent execution of a user's undesired function by a touch input.

Figure 12A:
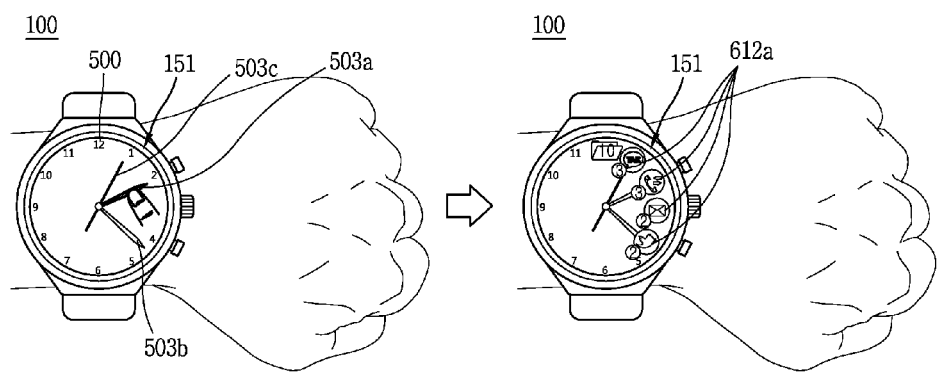
FIGS. 12A to 12C are conceptual views illustrating a method of controlling a mobile terminal by using a pressure touch applied to an initial screen.
Figure 12B:
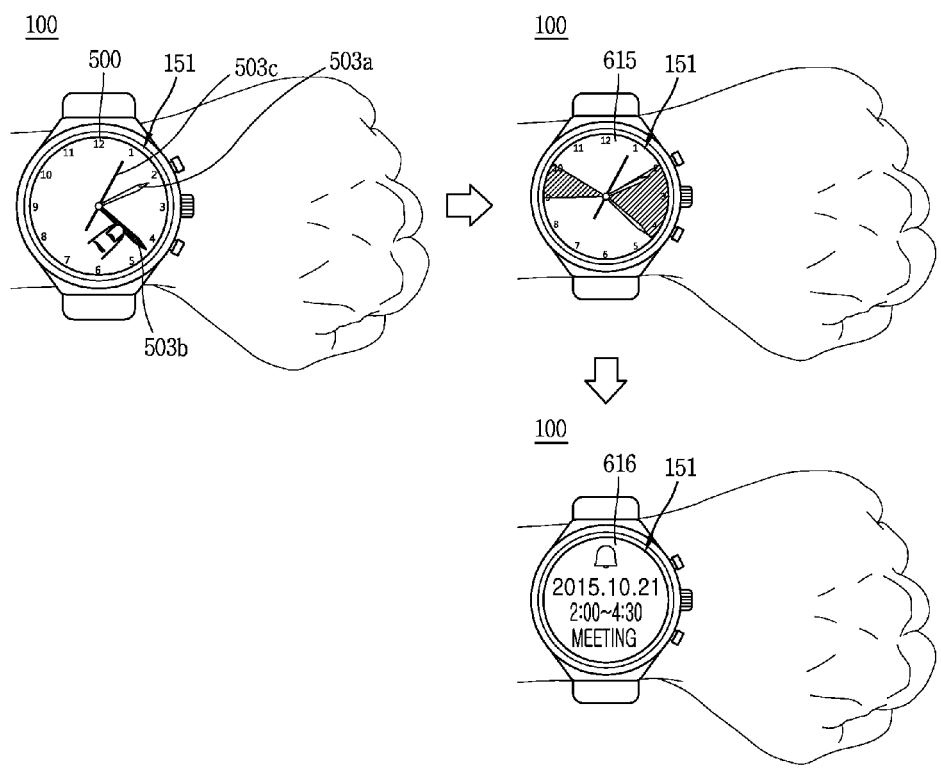
Figure 12C:
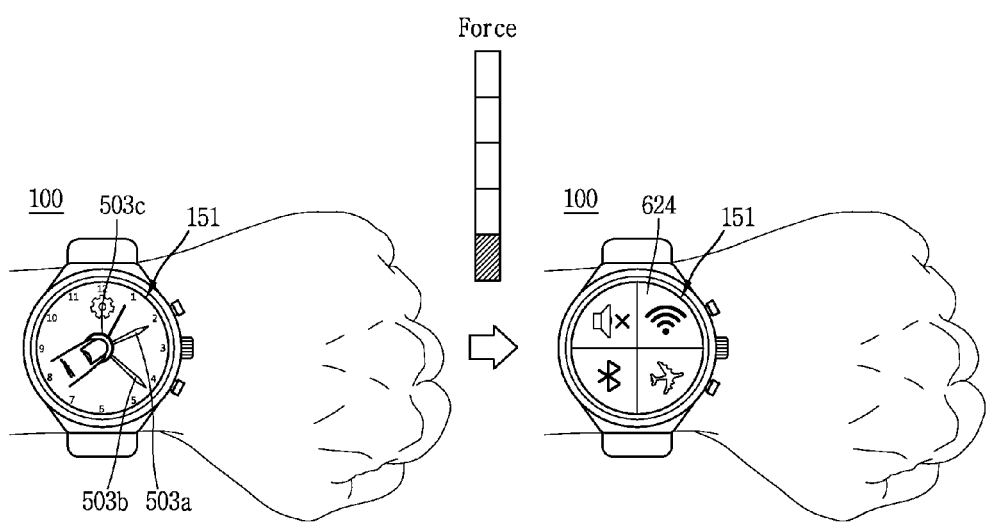

FIGS. 12A to 12C are conceptual views illustrating a method of controlling a mobile terminal by using a pressure touch applied to an initial screen. The initial screen includes numbers indicating time, an hour hand 503a, a minute hand 503b and a center point 503c. The controller 180 controls the display unit 151 to change time information or to change a design of the initial screen, based on a touch input applied to the initial screen.

Referring to FIG. 12A, the controller 180 may display notification icons 612a indicating received events on numbers of the initial screen, based on a pressure touch applied to the hour hand 503a.

Referring to FIG. 12B, the controller 180 may display schedules pre-stored in the memory 170 on the initial screen, based on a pressure touch applied to the minute hand 503b.

Referring to FIG. 12C, the controller 180 may control the display unit 151 to output a setting screen 624 for changing a driving setting of the watch-type mobile terminal 100, based on a pressure touch applied to the center point 503c. The setting screen 624 includes images for controlling a communication state, a driving mode, an output mode, etc.

In this embodiment, preset screen information may be provided or the mobile terminal may execute a specific function without undergoing a plurality of steps, based on a pressure touch applied to the hour hand and the minute hand indicating a current time, in a state where the specific function has not been executed.

Figure 13:
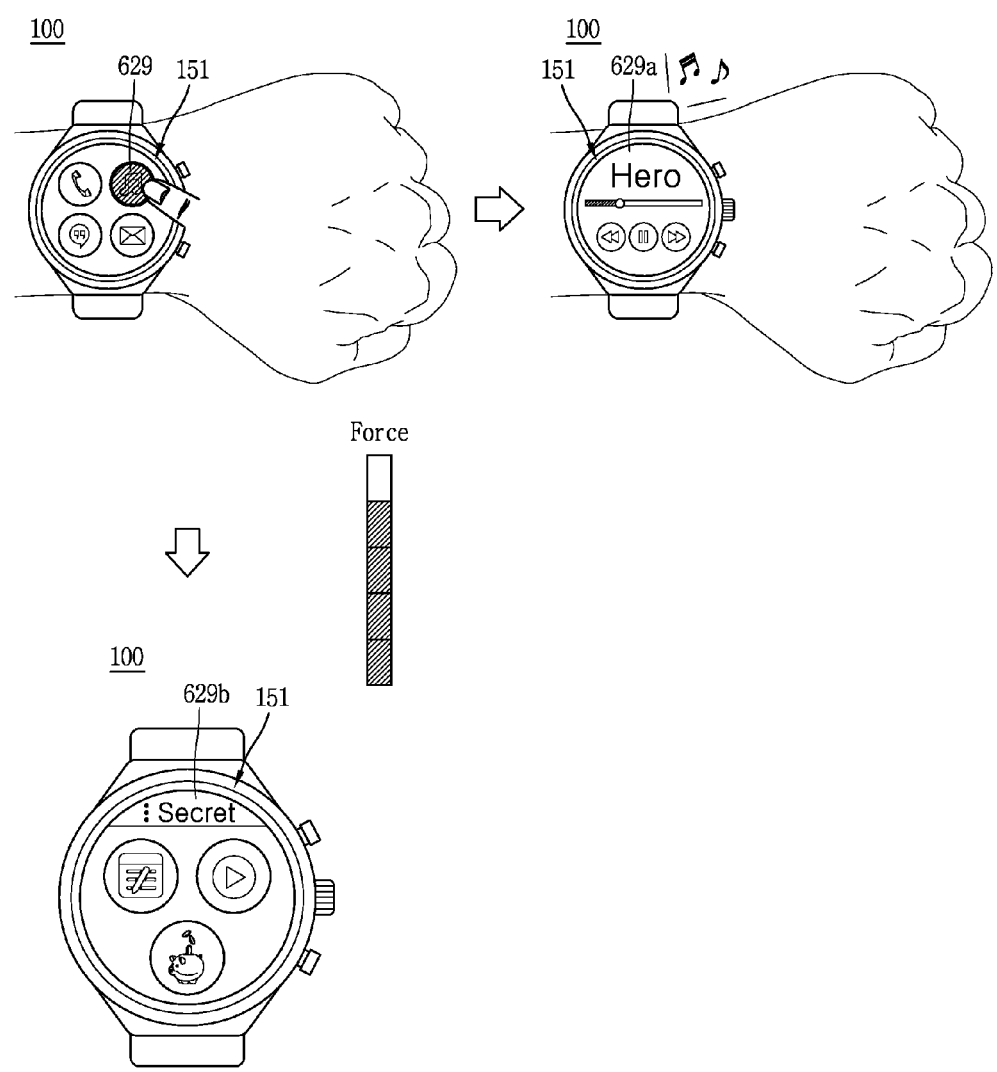
FIG. 13 is a conceptual view illustrating a method of executing a different function according to a different touch type.

FIG. 13 is a conceptual view illustrating a method of executing a different function according to a different touch type.

The display unit 151 displays at least one icon 629 corresponding to a specific application. If a general touch having a pressure value less than a reference value is applied to the icon 629, the controller 180 executes the specific application, and controls the display unit 151 to output an execution screen 629a.

If a pressure touch having a specific pressure value is applied to the icon 629, the controller 180 activates a secret mode. In the secret mode, the display unit 151 outputs a graphic image indicating at least one function corresponding to the icon 629. In this case, execution of the specific application is limited.

In this embodiment, when a general touch and a pressure touch are applied to a single icon, different functions may be executed. A user may set his or her own function to a specific icon.

Figure 14:
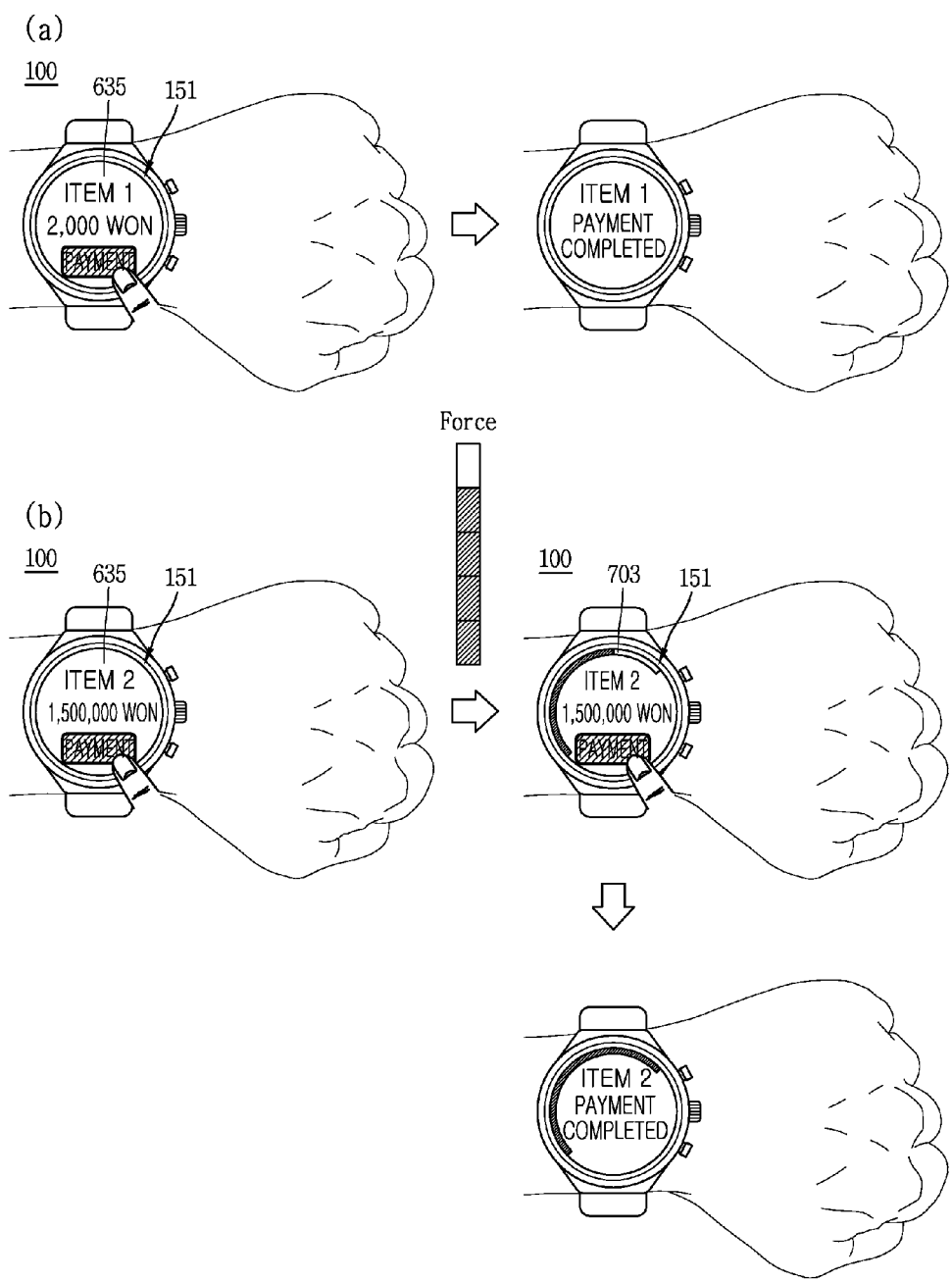
FIG. 14 is a conceptual view illustrating a method of controlling the same function of a mobile terminal in a different manner, based on different information.

FIG. 14 is a conceptual view illustrating a method of controlling the same function of a mobile terminal in a different manner, based on different information. The function may be executed based on video information output to the display unit 151.

Referring to FIGS. 14(a) and 14(b), the controller 180 outputs a payment screen 635. The payment screen 635 includes different information on the amount of money.

If amount information corresponds to a small amount of money based on a specific reference, the controller 180 executes a payment function based on a general touch applied to the payment screen 635. However, if amount information corresponds to a large amount of money based on the specific reference, the controller 180 does not execute the payment function even if a general touch is applied to the payment screen 635.

If a pressure touch is applied to the payment screen 635, the controller 180 executes the payment function. If the pressure touch is applied to the payment screen 635, the display unit 151 may output an indicator 703 indicating an intensity of the pressure touch or a time point when the pressure touch has been applied. If the pressure touch satisfies a preset reference, the controller 180 terminates the payment function.

In this embodiment, if the same function has different information, the function may be executed based on a different type of touch input. For instance, the controller 180 may control a function to be executed only based on a pressure touch, if a user's risk due to information may be caused.

Various embodiments may be implemented using a machine-readable medium having instructions stored thereon for execution by a processor to perform various methods presented herein. Examples of possible machine-readable mediums include HDD(Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 1800 of the mobile terminal.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A wearable watch-type mobile terminal, comprising:
a terminal body having a display;
a sensor unit located at the terminal body and including:
   a light emitting portion for emitting light; and
   a light receiving portion for sensing reflected light; and
a controller configured to:
   cause the light emitting portion to emit light of first intensity at first time intervals;
   cause the light emitting portion to emit light of second intensity at second time intervals occurring between the first time intervals;
   calculate a pressure value of a touch applied to the display based on an amount of light incident on the light receiving portion;
   generate a specific control command based on the pressure value, wherein the amount of light incident on the light receiving portion increases as the sensor unit moves closer to skin of a user by a pressure of the touch applied to the display;
   determine that the touch is a pressure touch when a difference between a first amount of light measured initially and a second amount of light measured while the pressure is applied or released is greater than a first reference value; and
   determine that the touch is a general touch when the difference is less than a second reference value that is less than the first reference value,
   wherein the specific control command is generated differently based on whether the touch is the pressure touch or the general touch.

2. The watch-type mobile terminal of claim 1, wherein the controller is further configured to:
determine whether the watch-type mobile terminal is worn on a wrist of the user;
control the second intensity and an output duration of the light of the second intensity based on information about a skin color of the user.

3. The watch-type mobile terminal of claim 2, wherein the controller is further configured to control the second intensity based on an amount of light reflected from the skin of the user and sensed by the light receiving portion.

4. The watch-type mobile terminal of claim 3, wherein the controller is further configured to control the second intensity and the output duration based on whether the amount of the reflected light is between a preset minimum amount and a preset maximum amount.

5. The watch-type mobile terminal of claim 2, further comprising a memory,
wherein the controller is further configured to:
cause the memory to store a plurality of images corresponding to skin colors, and a plurality of reference information related with intensity of light and an output duration of light; and
control the second intensity and the output duration based on reference information corresponding to one selected from the plurality of images.

6. The watch-type mobile terminal of claim 5, wherein the controller is further configured to:
cause the display to selectively output part of the plurality of images; and
control the second intensity and the output duration based on a control command received while the part of the plurality of images is output via the display.

7. The watch-type mobile terminal of claim 2, wherein the controller is further configured to control the second intensity and the output duration based on a change of an amount of the reflected light sensed by the light receiving portion while a touch is being applied to the display.

8. The watch-type mobile terminal of claim 7, wherein the controller is further configured to cause the display to output a guide image for guiding application of the touch with a minimum pressure or a maximum pressure.

9. The watch-type mobile terminal of claim 1, wherein the controller is further configured to:
determine whether the watch-type mobile terminal is worn by the user;
generate a control command based on a specific type of touch input when the watch-type mobile terminal is not worn.

10. The watch-type mobile terminal of claim 9, wherein the specific type of touch input is at least one of a long touch input or a touch input sequentially applied to a preset region.

11. The watch-type mobile terminal of claim 9, wherein the controller is further configured to:
cause the display to output an indicator to one region corresponding to the sensor unit; and
cause the display to change an appearance of the indicator or to stop the outputting of the indicator when light reflected from the skin of the user is sensed by the light receiving portion.

12. The watch-type mobile terminal of claim 1, wherein a first function is executed when the pressure value of the touch applied to the display is within a first range of values and a second function is executed when the pressure value of the touch applied to the display is within a second range of values.

13. The watch-type mobile terminal of claim 12, wherein the controller is further configured to cause the display to output more information as the pressure value of the touch applied to the display increases.

14. The watch-type mobile terminal of claim 1, wherein the controller is further configured to:
cause the display to output an icon corresponding to a specific function; and
execute the specific function when a touch input applied to the icon has a pressure value that is equal to or greater than a reference value,
wherein the specific function is not executed when the touch input applied to the icon has a pressure value that is less than the reference value.

15. The watch-type mobile terminal of claim 14, wherein the controller is further configured to execute the specific function in response to the touch input that has the pressure value that is less than the reference value when the icon includes visual information that allows the execution of the specific function regardless of the pressure value of the touch input.

16. The watch-type mobile terminal of claim 1, wherein the controller is further configured to:
cause the display to output an icon for receiving a touch input for executing a specific application;
execute the specific application and cause the display to output an execution screen associated with the execution of the specific application in response to a first touch input applied to the icon when the first touch input has a pressure value that is less than a reference value; and
activate a preset driving mode and cause the display to output a graphic image corresponding to an additional function associated with the specific application in response to a second touch input applied to the icon when the second touch input has a pressure value that is equal to or greater than the reference value.

17. A method for controlling a wearable watch-type mobile terminal having a display and a sensor unit including a light emitting portion and a light receiving portion, the method comprising:
emitting light of first intensity at first time intervals via the light emitting portion;
emitting light of second intensity at second time intervals occurring between the first time intervals;
calculating a pressure value of a touch applied to the display based on an amount of light incident on the light receiving portion;
generating a specific control command based on the pressure value, wherein the amount of light incident on the light receiving portion increases when the sensor unit moves closer to skin of a user by a pressure of the touch applied to the display;
determining that the touch is a pressure touch when a difference between a first amount of light measured initially and a second amount of light measured while the pressure is applied or released is greater than a first reference value; and
determining that the touch is a general touch when the difference is less than a second reference value that is less than the first reference value,
wherein the specific control command is generated differently based on whether the touch is the pressure touch or the general touch.

18. The method of claim 17, further comprising:
determining whether the watch-type mobile terminal is worn on a wrist of the user;
setting information about a skin color of the user; and
controlling the second intensity and an output duration of the light of the second intensity based on the information about the user's skin color.

19. The method of claim 17, further comprising generating a control command based on an specific type of touch input received by the terminal when the watch-type mobile terminal is not worn by the user.

20. The method of claim 17, further comprising executing a function based on a pressure value of a touch applied to the display such that a first function is executed when the pressure vale is less than a reference value and a second function is executed when the pressure value is equal to or greater than the reference value.

* * * * *